(12) United States Patent
Taguchi et al.

(10) Patent No.: US 7,371,972 B2
(45) Date of Patent: May 13, 2008

(54) ELECTRICAL WIRING STRUCTURE, MANUFACTURING METHOD THEREOF, ELECTRO-OPTICAL DEVICE SUBSTRATE HAVING ELECTRICAL WIRING STRUCTURE, ELECTRO-OPTICAL DEVICE, AND MANUFACTURING METHOD THEREOF

(75) Inventors: Satoshi Taguchi, Matsumoto (JP); Kazuo Oike, Suwa (JP); Hideki Uehara, Chino (JP); Katsuhiro Imai, Minowa-Machi (JP); Chihiro Tanaka, Matsumoto (JP)

(73) Assignee: Seiko Epson Corporation (JP)

( * ) Notice: Subject to any disclaimer, the term of this patent is extended or adjusted under 35 U.S.C. 154(b) by 388 days.

(21) Appl. No.: 10/833,258

(22) Filed: Apr. 27, 2004

(65) Prior Publication Data

US 2004/0257787 A1   Dec. 23, 2004

(30) Foreign Application Priority Data

May 1, 2003   (JP)   ............................. 2003-126569
May 1, 2003   (JP)   ............................. 2003-126570

(51) Int. Cl.
*H01R 12/14* (2006.01)
(52) U.S. Cl. ...................... 174/261; 361/760
(58) Field of Classification Search ............... 174/256, 174/262, 261; 361/792, 794, 803; 257/748, 257/764, 784
See application file for complete search history.

(56) References Cited

U.S. PATENT DOCUMENTS 6,660,626 B1 * 12/2003 Lin ............................ 438/618
6,809,390 B2    10/2004 Toda et al.
6,822,164 B2 * 11/2004 Tsuji et al. ................. 174/549
2002/0088984 A1 *  7/2002 Toda et al.
2003/0102522 A1 *  6/2003 Lee
2005/0017242 A1 *  1/2005 Yamazaki et al.

FOREIGN PATENT DOCUMENTS

JP    2001-075118    3/2001
JP    2002-229474    8/2002
KR    2001-0066244   7/2001

OTHER PUBLICATIONS

Communication from Korean Patent Office regarding counterpart application.

* cited by examiner

*Primary Examiner*—Tuan T. Dinh
*Assistant Examiner*—Yuriy Semenenko
(74) *Attorney, Agent, or Firm*—Harness, Dickey & Pierce, P.L.C.

(57) ABSTRACT

An electrical wiring structure is provided which can be formed simultaneously when non-linear elements containing corrosion resistant metal wires and non-corrosion resistant metal wires are formed. In addition, a manufacturing method of the electrical wiring structure, an electro-optical device substrate provided with the electrical wiring structure, an electro-optical device, and a manufacturing method thereof are also provided. In particular, an oxide layer and the non-corrosion resistant metal wire are sequentially formed on a surface of the corrosion resistant metal wire. An exposed portion of the corrosion resistant metal wire is formed by removing part of the oxide layer. An electrical connection auxiliary member, such as a through-hole formed at the exposed portion or a conductive inorganic oxide film formed on the corrosion resistant metal wire and the exposed portion, is formed to electrically connect the corrosion resistant metal wire and the non-corrosion resistant metal wire.

15 Claims, 24 Drawing Sheets

(a)

(b)

(a)

(b)

(c)

(d)

(e)

(f)

(g)

(h)

(a)

(b)

(c)

(d)

(a)

(b)

(c)

(a)

(b)

(c)

(d)

(e)

(a)

(b)

ELECTRICAL WIRING STRUCTURE, MANUFACTURING METHOD THEREOF, ELECTRO-OPTICAL DEVICE SUBSTRATE HAVING ELECTRICAL WIRING STRUCTURE, ELECTRO-OPTICAL DEVICE, AND MANUFACTURING METHOD THEREOF

RELATED APPLICATIONS

This application claims priority to Japanese Patent Application Nos. 2003-126569 filed May 1, 2003 and 2003-126570 filed May 1, 2003 which are hereby expressly incorporated by reference herein in their entirety.

BACKGROUND OF THE INVENTION

1. Field of the Invention

The present invention relates to electrical wiring structures for electrically connecting between a corrosion resistant metal wire and a non-corrosion resistant metal wire, manufacturing methods of electrical wiring structures, electro-optical device substrates having electrical wiring structures, electro-optical devices, and manufacturing methods of electro-optical devices.

In particular, the present invention relates to an electrical wiring structure that can be formed simultaneously when non-linear elements or the like containing corrosion resistant metal wires and non-corrosion resistant metal wires are formed, a manufacturing method of the electrical wiring structure, an electro-optical device substrate having the electrical wiring structure, an electro-optical device using the electro-optical device substrate, and a manufacturing method of the electro-optical device.

2. Description of the Prior Art

Heretofore, liquid crystal display devices have been composed of a pair of electro-optical device substrates, i.e., a first electro-optical device substrate and a second electro-optical device substrate facing thereto, and a liquid crystal material provided therebetween.

As the liquid crystal display device described above, an active matrix liquid crystal display device has thin film diodes as a non-linear element (switching element) as shown in FIG. 24. More particularly, counter electrodes are provided on a first electro-optical device substrate, a plurality of pixel electrodes arranged in a matrix is provided on a second electro-optical substrate, and thin film diodes are electrically connected to respective pixel electrodes. In addition, in this liquid crystal display device described above, there are provided exterior wires used as a terminal portion on which a drive IC disposed outside a seal material is to be mounted, interior wires disposed inside the seal material, and bypass portions electrically connecting between the exterior wires and the interior wires, and the bypass portions are formed of a corrosion resistant material such as tantalum (Ta) or indium tin oxide (ITO).

However, in the case of the liquid crystal display device described above, when the bypass portions made of a corrosion resistant material are formed, and the exterior wires and the interior wires are simply connected to each other, the connection resistance, variation in connection resistance, electrical power consumption, or image display irregularities may be disadvantageously increased in some cases.

Accordingly, the present invention was made to solve the problems described above, and an object of the present invention is to provide an electrical wiring structure which is obtained by using a process for forming non-linear elements or the like containing corrosion resistant metal wires and non-corrosion metal wires and which has low electrical resistance and superior corrosion resistance even when exterior wires and interior wires are electrically connected to each other.

In addition, another object of the present invention is to provide a manufacturing method of the electrical wiring structure described above, an electro-optical device substrate provided with the electrical wiring structure, an electro-optical device using the electro-optical device substrate, and a manufacturing method of the electro-optical device.

SUMMARY

According to one aspect of the present invention, an electrical wiring structure for electrically connecting between a corrosion resistant metal wire and a non-corrosion resistant metal wire is provided. The electrical wiring structure described above is produced by a process comprising the steps of: forming the corrosion resistant metal wire from a corrosion resistant metal; forming an oxide layer thereof on a surface of the corrosion resistant metal wire; removing at least a part of the oxide layer of the corrosion resistant metal to form an exposed portion of the corrosion resistant metal wire; forming an electrical connection auxiliary member at the exposed portion; and forming the non-corrosion resistant metal wire, whereby the corrosion resistant metal wire is electrically connected to the non-corrosion resistant metal wire via the electrical connection auxiliary member disposed at the exposed portion. Hence, by this electrical wiring structure, the problems described above can be solved.

That is, by using a process of forming non-linear elements or the like containing the corrosion resistant metal wires and the non-corrosion resistant metal wires, the corrosion resistant metal wire and the non-corrosion resistant metal wire can be reliably electrically connected to each other with the electrical connection auxiliary member disposed at the exposed portion of the corrosion resistant metal wire. Hence, an electrical wiring structure having low electrical resistance and superior corrosion resistant can be easily formed.

In addition, in the electrical wiring structure according to the present invention, and in a manufacturing method of the electrical wiring structure, an electro-optical device substrate having the electrical wiring structure, an electro-optical device using the electro-optical device substrate, and a manufacturing method of the electro-optical device, which will be described later, as the electrical connection auxiliary member, for example, a through-hole penetrating the oxide layer of the corrosion resistant metal or a conductive inorganic oxide film formed on the non-corrosion resistant metal wire and the exposed portion may be preferable.

In addition, in accordance with another aspect of the present invention, a method for manufacturing an electrical wiring structure for electrically connecting between a corrosion resistant metal wire and a non-corrosion resistant metal wire is provided. The manufacturing method described above comprises the steps of: forming the corrosion resistant metal wire from a corrosion resistant metal on an electrical insulating substrate; forming an oxide layer of the corrosion resistant metal on a surface of the corrosion resistant metal wire; removing at least a part of the oxide layer of the corrosion resistant metal to form an exposed portion of the corrosion resistant metal wire; forming an electrical connection auxiliary member at the exposed portion; and forming the non-corrosion resistant metal wire, whereby the corrosion resistant metal wire is electrically connected to the non-corrosion resistant metal wire via the electrical connection auxiliary member disposed at the exposed portion.

That is, according to the manufacturing method described above, an electrical wiring structure having low electrical resistance and superior corrosion resistance can be effectively formed using the electrical connection auxiliary member. In addition, according to the manufacturing method described above, by using a process of forming non-linear elements or the like containing the corrosion resistant metal wires and the non-corrosion resistant metal wires, a predetermined electrical wiring structure can be simultaneously formed.

In addition, in accordance with another aspect of the present invention, a pair of electro-optical device substrates used for an electro-optical device is provided comprising a first electro-optical device substrate and a second electro-optical device substrate facing thereto. In the pair of electro-optical device substrates described above, the first electro-optical device substrate comprises: a first glass substrate used as a substrate; and electrical wires provided thereon. The second electro-optical device substrate comprises: a second glass substrate used as a counter substrate; first electrodes, insulating films, and second electrodes, which form two-terminal non-linear elements; and electrical wiring structures for electrically connecting between corrosion resistant metal wires provided on the second glass substrate and non-corrosion resistant metal wires to be electrically connected to the first electrodes and the second electrodes.

The electrical wiring structures described above are electrical wiring structures each produced by a process comprising the steps of: forming the corrosion resistant metal wire from a corrosion resistant metal; forming an oxide layer of the corrosion resistant metal on a surface of the corrosion resistant metal wire; removing at least a part of the oxide layer of the corrosion resistant metal to form an exposed portion of the corrosion resistant metal wire; forming an electrical connection auxiliary member at the exposed portion; and forming the non-corrosion resistant metal wire, thereby the corrosion resistant metal wire being electrically connected to the non-corrosion resistant metal wire via the electrical connection auxiliary member disposed at the exposed portion.

That is, according to the structure described above, an electrical wiring structure having low electrical resistance and superior corrosion resistant can be easily formed. In addition, according to the electro-optical device substrates described above, by using a process for forming the two-terminal non-linear elements of a particular structure containing the corrosion resistant metal wires and the non-corrosion resistant metal wires, the electrical wiring structures described above can be simultaneously formed on the electro-optical device substrate.

In addition, in accordance with another aspect of the present invention, an electro-optical device is provided comprising a first electro-optical device substrate, a second electro-optical device substrate facing thereto, and an electro-optical material provided therebetween. In the electro-optical device described above, the first electro-optical device substrate comprises: a first glass substrate used as a substrate; and electrical wires provided thereon, and the second electro-optical device substrate comprises: a second glass substrate used as a counter substrate; first electrodes, insulating films, and second electrodes, which form two-terminal non-linear elements; and electrical wiring structures for electrically connecting between corrosion resistant metal wires provided on the second glass substrate and non-corrosion resistant metal wires to be electrically connected to the first electrodes and the second electrodes.

The electrical wiring structures described above are electrical wiring structures each produced by a process comprising the steps of: forming the corrosion resistant metal wire from a corrosion resistant metal; forming an oxide layer of the corrosion resistant metal on a surface of the corrosion resistant metal wire; removing at least a part of the oxide layer of the corrosion resistant metal to form an exposed portion of the corrosion resistant metal wire; forming an electrical connection auxiliary member at the exposed portion; and forming the non-corrosion resistant metal wire, thereby the corrosion resistant metal wire being electrically connected to the non-corrosion resistant metal wire via the electrical connection auxiliary member disposed at the exposed portion.

That is, according to the structure described above, the electro-optical device can be easily obtained by using the electro-optical device substrate provided with an electrical wiring structure having low electrical resistance and superior corrosion resistant obtained by the presence of the electrical connection auxiliary member. In addition, according to the electro-optical device described above, by using a process of forming the two-terminal non-linear elements of a particular structure containing the corrosion resistant metal wires and the non-corrosion resistant metal wires, predetermined electrical wiring structures can be simultaneously formed on the electro-optical device substrate.

In addition, in accordance with another aspect of the present invention, there is provided a method for manufacturing an electro-optical device comprising a first electro-optical device substrate, a second electro-optical device substrate facing thereto, and an electro-optical material provided therebetween. The manufacturing method described above comprises the steps of: forming the first electro-optical device substrate which comprises: a first glass substrate used as a substrate, color layers, black matrix as a shading layer, and electrical wires provided on the first glass substrate; and forming the second electro-optical device substrate which comprises: a second glass substrate used as a counter substrate; first electrodes, insulating films, and second electrodes, which form two-terminal non-linear elements; and electrical wiring structures for electrically connecting between corrosion resistant metal wires provided on the second glass substrate and non-corrosion resistant metal wires to be electrically connected to the first-electrodes and the second electrodes.

The electrical wiring structures described above are electrical wiring structures each produced by a process comprising the steps of: forming the corrosion resistant metal wire from a corrosion resistant metal on the second glass substrate; forming an oxide layer of the corrosion resistant metal on a surface of the corrosion resistant metal wire; removing at least a part of the oxide layer of the corrosion resistant metal to form an exposed portion of the corrosion resistant metal wire; forming an electrical connection auxiliary member at the exposed portion; and forming the non-corrosion resistant metal wire, thereby the corrosion resistant metal wire being electrically connected to the non-corrosion resistant metal wire via the electrical connection auxiliary member disposed at the exposed portion.

That is, as described above, the electro-optical device substrate can be formed which is provided with electrical wiring structures having low electrical resistance and superior corrosion resistant by the presence of the electrical connection auxiliary member, and hence the electro-optical device using the substrate described above can be effectively provided.

In addition, according to the method for manufacturing an electro-optical device described above, by using a process of forming the two-terminal non-linear elements of a particular structure containing the corrosion resistant metal wires and the non-corrosion resistant metal wires, electrical wiring structures having low electrical resistance and superior corrosion resistant can be simultaneously formed on the electro-optical device substrate. Hence, an electro-optical device can be effectively formed which employs electro-optical device substrates having predetermined electrical wiring structures.

DETAILED DESCRIPTION

Hereinafter, with reference to figures, embodiments of the present invention will be described in detail, relating to an electrical wiring structure, a manufacturing method thereof, an electro-optical device substrate provided with the electrical wiring structure, an electro-optical device using the electro-optical device substrate, and a manufacturing method thereof.

However, the following embodiments will be described by way of example and are not intended to limit the present invention, and hence it is to be understood that the present invention will be optionally modified without departing from the spirit and the scope of the present invention.

First Embodiment

Figure 1:
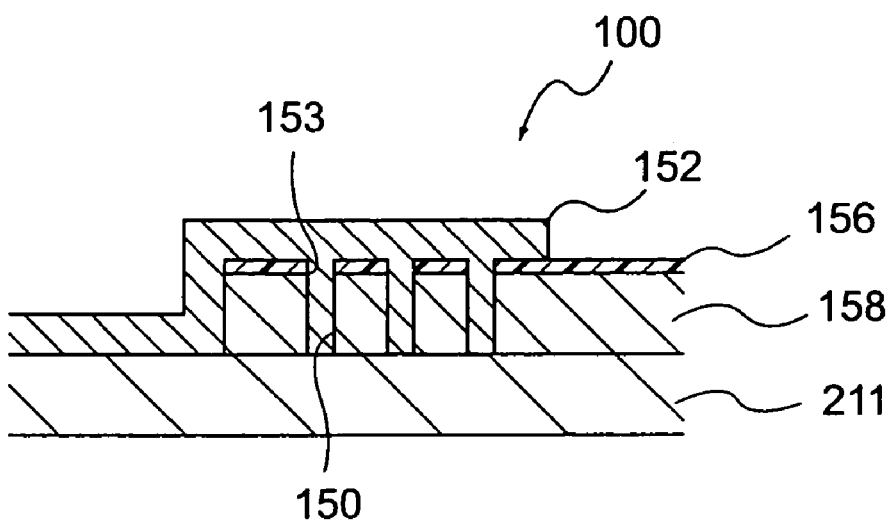
FIG. 1 is a view for illustrating an electrical wiring structure according to a first embodiment.

According to a first embodiment, as shown in FIG. 1 by way of example, an electrical wiring structure 100 is provided which electrically connects between a corrosion resistant metal wire 158 and a non-corrosion resistant metal wire 152. In this electrical wiring structure 100, an oxide layer 156 of a corrosion resistant metal is formed on a surface of the corrosion resistant metal wire 158, an exposed portion 153 is formed by removing at least a part of the oxide layer 156 of the corrosion resistant metal at a position at which a bonding portion between the corrosion resistant metal wire 158 and the non-corrosion resistant metal wire 152 is to be formed, and the corrosion resistant metal wire 158 and the non-corrosion resistant metal wire 152 are electrically connected to each other via an electrical connection auxiliary member 150 disposed at the exposed portion 153.

1. Corrosion Resistant Metal Wire (1) Material

As corrosion resistant metal wires, tantalum wires are commonly used. As a material for forming the tantalum wires, a material is not specifically limited as long as it is primarily composed of tantalum; however, for example, pure tantalum or an alloy thereof containing molybdenum, chromium, tungsten, titanium, or the like may be mentioned.

As a corrosion resistant metal, in addition to tantalum, pure tungsten or an alloy thereof may also be preferably used.

(2) Line Width

In addition, the line width of the corrosion resistant metal wire is preferably set in the range of from 2 to 300 μm.

The reason for this is that when the line width of this corrosion resistant metal wire is less than 2 μm, bonding thereof to a non-corrosion resistant metal wire such as a chromium wire becomes difficult, and as a result, the connection resistance may be increased in some cases. On the other hand, when the line width of the corrosion resistant metal wire is more than 300 μm, it may become difficult in some cases to optionally place wires on an electro-optical device substrate or to decrease pitches between wires.

Hence, the line width of the corrosion resistant metal wire is more preferably set in the range of from 5 to 100 µm and even more preferably set in the range of from 10 to 50 µm.

(3) Thickness

In addition, the thickness of the corrosion resistant metal wire is preferably set in the range of from 0.01 to 1 µm.

The reason for this is that when the thickness of this corrosion resistant metal wire is less than 0.01 µm, the thin film resistance may be increased or bonding thereof to a non-corrosion resistant metal wire such as a chromium wire becomes difficult, and as a result, the connection resistance may be increased in some cases. On the other hand, when the thickness of the corrosion resistant metal wire is more than 1 µm, it may become difficult in some cases to optionally place wires on an electro-optical device substrate or to perform etching with superior accuracy.

Hence, the thickness of the corrosion resistant metal wire is more preferably set in the range of from 0.05 to 0.3 µm and even more preferably set in the range of from 0.05 to 0.15 µm.

(4) Relationship with Seal Material

Figure 2:
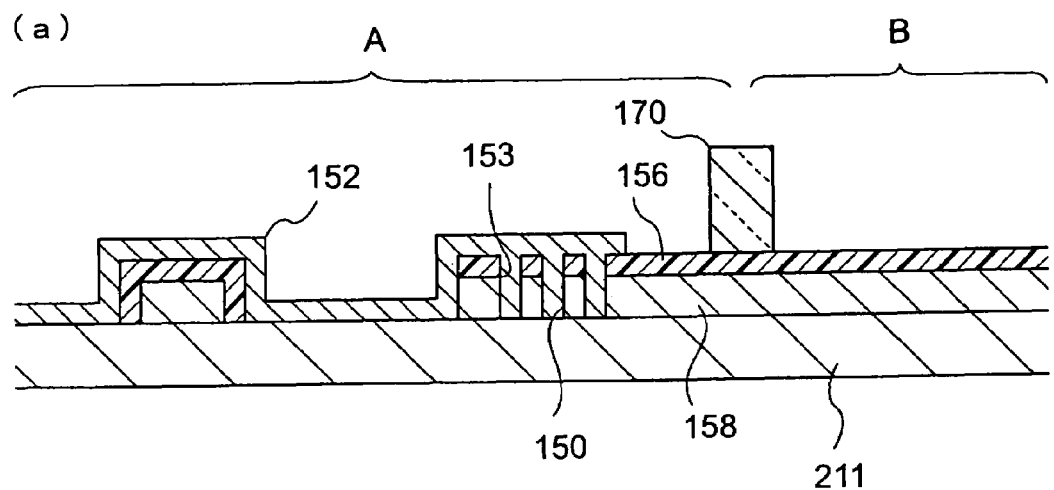
FIGS. 2(a) and (b) are views for illustrating the relationship between a seal material and an electrical wiring structure of an electro-optical device according to the first embodiment.
Figure 2:
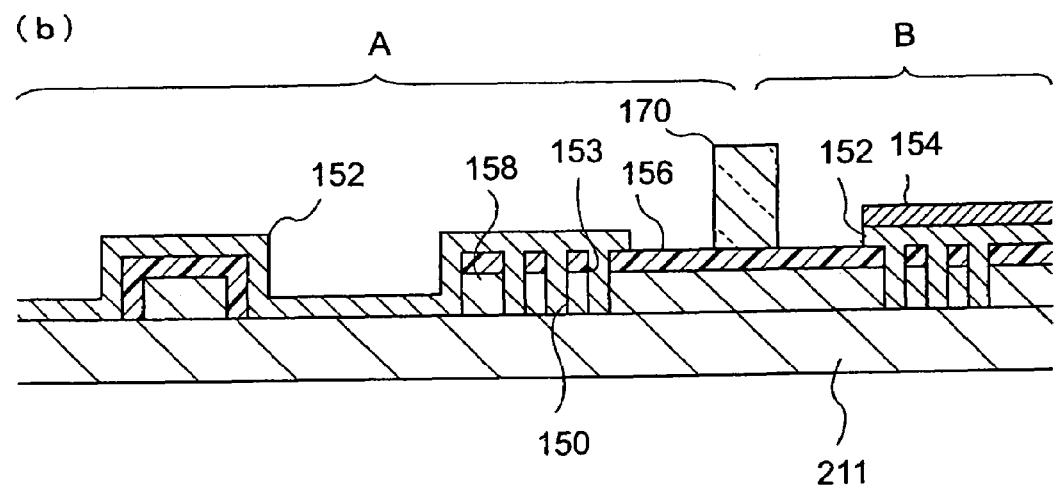

In addition, the corrosion resistant metal wire has superior corrosion resistance to that of the non-corrosion resistant metal wire. Hence, for example, as shown in FIG. 2(a), it is preferably that for interior wiring (portion A) inside a seal material 170 provided for an electro-optical device, the non-corrosion resistant metal wire 152 be used, and that for exterior wiring (portion B) outside the seal material 170 subjected to a harsh corrosive environment, the corrosion resistant metal wire 158 having superior corrosion resistance be disposed.

2. Non-Corrosion Resistant Metal Wire (1) Material

As non-corrosion resistant metal wires, chromium wires are commonly used. As a material for forming the chromium wires, a material is not specifically limited as long as it is primarily composed of chromium; however, for example, pure chromium or an alloy thereof containing molybdenum, tantalum, titanium, or the like may be mentioned.

In addition, besides chromium, aluminum, molybdenum, titanium, or an alloy thereof may also be preferably used.

(2) Line Width

In addition, the line width of the non-corrosion resistant metal wire is preferably set in the range of from 2 to 300 µm.

The reason for this is that when the line width of this non-corrosion resistant metal wire is less than 2 µm, bonding thereof to a corrosion resistant metal wire becomes difficult, and as a result, the connection resistance may be increased in some cases. On the other hand, when the line width of the non-corrosion resistant metal wire is more than 300 µm, it may become difficult in some cases to optionally place wires on an electro-optical device substrate or to decrease pitches between wires.

Hence, the line width of the non-corrosion resistant metal wire is more preferably set in the range of from 5 to 100 µm and even more preferably set in the range of from 10 to 50 µm.

(3) Thickness

In addition, the thickness of the non-corrosion resistant metal wire is preferably set in the range of from 0.01 to 1 µm.

The reason for this is that when the thickness of this non-corrosion resistant metal wire is less than 0.01 µm, bonding thereof to a corrosion resistant metal wire becomes difficult, and as a result, the connection resistance may be increased in some cases. On the other hand, when the thickness of the non-corrosion resistant metal wire is more than 1 µm, it may become difficult in some cases to optionally place wires on an electro-optical device substrate or to perform etching with superior accuracy.

Hence, the thickness of the non-corrosion resistant metal wire is more preferably set in the range of from 0.03 to 0.5 µm and even more preferably set in the range of from 0.1 to 0.3 µm.

(4) Surface Treatment

Figure 3:
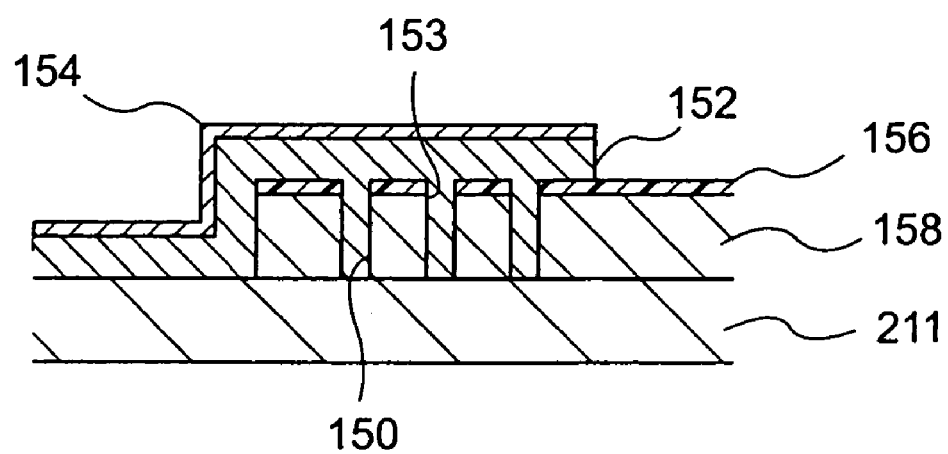
FIG. 3 is a view for illustrating another electrical wiring structure of an electro-optical device substrate according to the first embodiment.

In addition, as shown in FIG. 3, on the exterior surface of the non-corrosion resistant metal wire 152, a conductive inorganic oxide film 154 is preferably formed.

The reason for this is that due to the presence of the conductive inorganic oxide film, the corrosion resistance of the non-corrosion resistant metal wire can be improved, and in addition, connection reliability between the non-corrosion resistant metal wire and an anisotropic conductive film or the like mounted thereon can also be improved.

More particularly, for example, polycrystal indium tin oxide (c-ITO), amorphous indium tin oxide (a-ITO), amorphous indium zinc oxide (a-IZO), and amorphous indium germanium oxide (a-IGO) may be used alone or in combination for the conductive inorganic oxide material.

In addition, the thickness of the conductive inorganic oxide film is preferably set in the range of from 0.01 to 0.3 µm.

The reason for this is that when the thickness of this conductive inorganic oxide film is less than 0.01 µm, although the coating film is provided, it may be difficult in some cases to improve the corrosion resistance of the non-corrosion resistant metal wire. On the other hand, when the thickness of the conductive inorganic oxide film is more than 0.3 µm, it may become difficult in some cases to optionally place wires on an electro-optical device substrate or to perform etching with superior accuracy.

(5) Relationship with Seal Material

In addition, although having slightly inferior corrosion resistance to that of the corrosion resistant metal wire, the non-corrosion resistant metal wire has a low electrical resistance. Hence, as shown in FIG. 2(a), for the interior wiring (A portion) inside the seal material 170 provided for the electro-optical device, the non-corrosion resistant metal wire 152 having a low electrical resistance is used, and for the exterior wiring (B portion) outside the seal material 170 subjected to a harsh corrosive environment, the corrosion resistant metal wire 158 having superior corrosion resistance is preferably disposed. In addition, as shown in FIG. 2(b), when the non-corrosion resistant metal wire 152 is used for the exterior wiring (B portion) outside the seal material 170, the exterior surface of the non-corrosion resistant metal wire 152 is preferably covered with a conductive inorganic oxide film.

3. Electrical Connection Auxiliary Member

As an electrical connection auxiliary member for electrically connecting between the corrosion resistant metal wire and the non-corrosion resistant metal wire, as shown in FIG. 1, it is preferable that through-holes 150 penetrating at least the oxide layer 156 of the corrosion resistant metal be further formed, and in addition, that the non-corrosion resistant metal wire 152 be formed so as to extend inside the through-holes 150.

In addition, as will be described in detail in a second embodiment, as the electrical connection auxiliary member, it is preferable that the exposed portion 153 be formed by removing a part of the oxide layer 156 of the corrosion resistant metal, and in addition, that a conductive inorganic oxide film 155 (see FIG. 10) be formed on the non-corrosion resistant metal wire 152 and the exposed portion 153.

Furthermore, although not shown in the figure, as the electrical connection auxiliary member, a conductive adhesive, a solder material, a metal material, a connector, and the like may be preferably used alone or in combination.

Hereinafter, as the electrical connection auxiliary member, the through-hole and the conductive inorganic oxide film will be described in detail as a typical example.

(1) Through-Hole (i) Diameter

The diameter of the through-hole 150 (having an approximately circular shape) penetrating at least the oxide layer 156 of the corrosion resistant metal shown in FIG. 1 and the like is preferably set in the range of from 0.5 to 100 µm.

The reason for this is that when the diameter of this through-hole is less than 0.5 µm, bonding between the corrosion resistant metal wire and the non-corrosion resistant metal wire becomes difficult, and as a result, the connection resistance may be increased in some cases. On the other hand, when the diameter of the through-hole is more than 100 µm, it may become difficult in some cases to optionally place wires on an electro-optical device substrate or to perform etching with superior accuracy.

Hence, the diameter of the through-hole is more preferably set in the range of from 1 to 50 µm and even more preferably set in the range of from 3 to 20 µm.

(ii) Cross-Section

Figure 4:
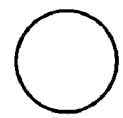
FIGS. 4(a) to (h) are views for illustrating cross-sections of through-holes.
Figure 4:
Figure 4:
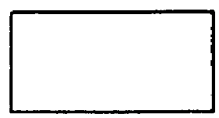
Figure 4:
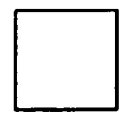
Figure 4:
Figure 4:
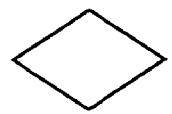
Figure 4:
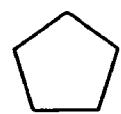
Figure 4:
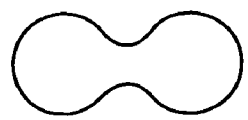

In addition, the cross-section of the through-hole is not particularly limited; however, as shown in FIGS. 4(*a*) to (*h*), for example, a circular, oval, rectangular, square, multilobal, rhombic, polygonal, and modified cross-section may be preferable.

Among those mentioned above, when having a circular or an oval cross-sectional, the through-hole can be formed with superior accuracy, and even when the area thereof is relatively small, the non-corrosion resistant metal wire can be reliably formed to extend inside the through-hole and can be electrically connected to the corrosion resistant metal wire.

In addition, when having a rectangular or a square cross-section, the through-hole can be formed with superior accuracy in conformity with the shape of a linear-shaped corrosion resistant metal wire, and even when the area is relatively small, the non-corrosion resistant metal wire can be reliably formed to extend inside the through-hole and can be electrically connected to the corrosion resistant metal wire. Furthermore, when having a multilobal, a rhombic, a polygonal, or a modified cross-section, the through-hole can be formed in conformity with the shape of the corrosion resistant metal wire.

(iii) Sidewall Shape

Figure 5:
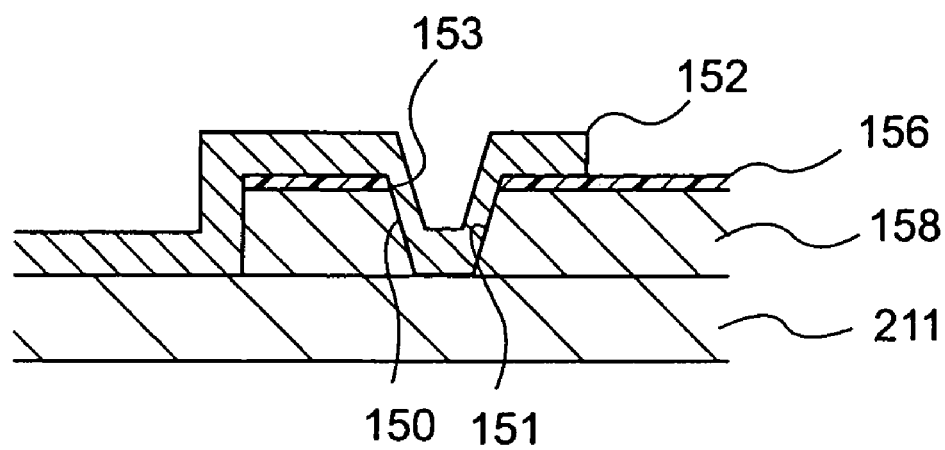
FIG. 5 is a view for illustrating a sidewall shape of a through-hole.

In addition, as for the shape of the through-hole, as shown in FIG. 5, the through-hole 150 preferably has an inclined sidewall 151.

Accordingly to the shape mentioned above, the connection resistance at the bonding portion between the corrosion resistant metal wire and the non-corrosion resistant metal wire can be further decreased, and in addition, the mechanical bonding force at the bonding portion can be further increased.

In addition, when the through-hole is formed to have an inclined sidewall, the angle thereof with respect to the direction parallel to the substrate is preferably set in the range of from 30° to 80°.

The reason for this is that when the angle of the inclined sidewall of the through-hole is less than 30°, it may become difficult in some cases to optionally place wires on an electro-optical device substrate or to perform etching with superior accuracy. On the other hand, when the angle of the inclined sidewall of the through-hole is more than 80°, bonding between the corrosion resistant metal wire and the non-corrosion resistant metal wire becomes difficult, and as a result, the connection resistance may be increased in some cases.

Hence, the angle of the inclined sidewall of the through-hole is more preferably set in the range of from 35° to 75° and even more preferably set in the range of from 40° to 70°.

(iv) Arrangement

Figure 6:
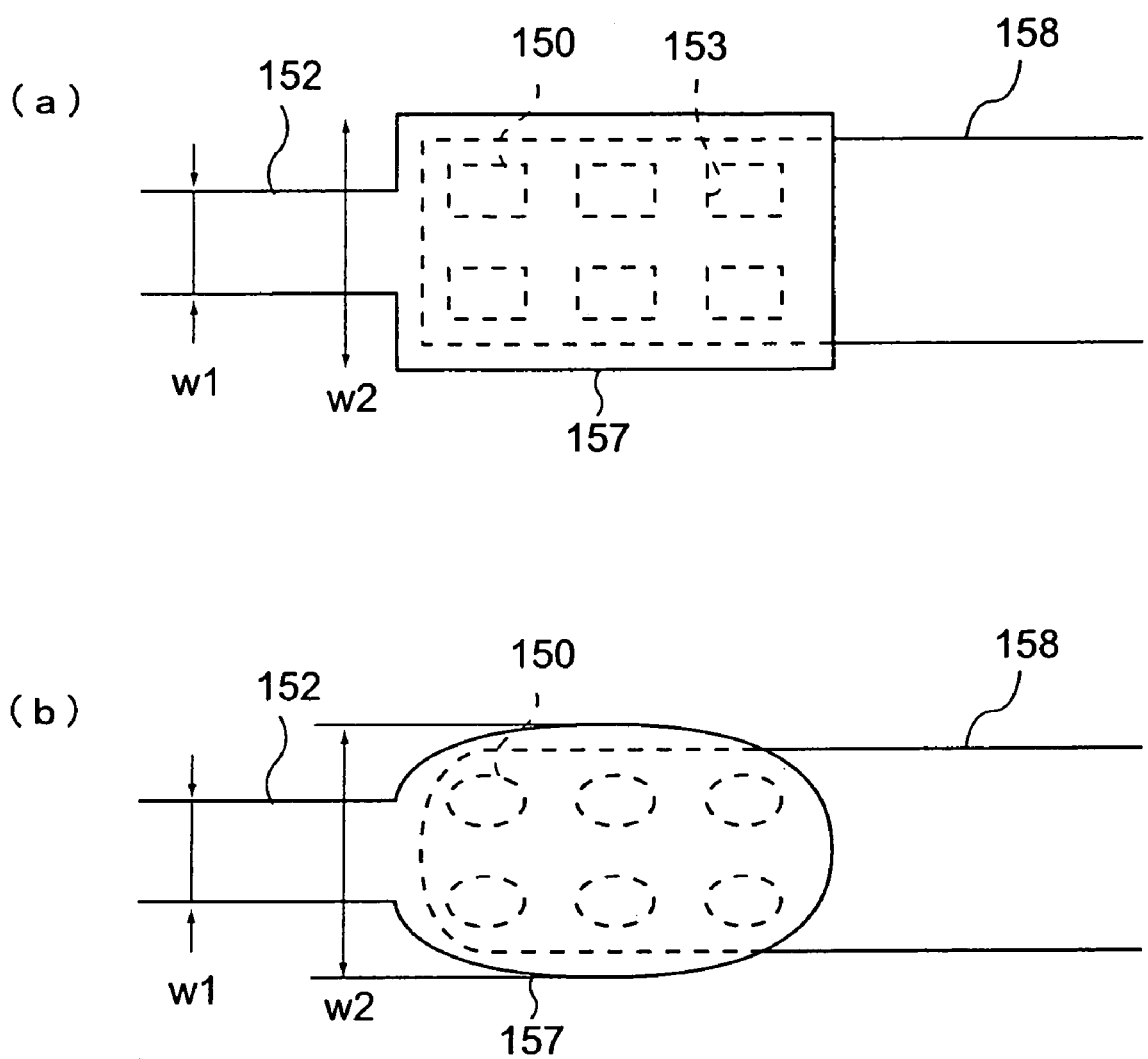
FIGS. 6(a) and (b) are views for illustrating a bonding portion.

In addition, as for the arrangement of the through-holes, it is preferable that a plurality of through-holes is formed, and that in addition, as shown in FIG. 6, at the bonding portion 157 between the corrosion resistant metal wire 158 and the non-corrosion resistant metal wire 152, the through-holes 150 be arranged in a matrix.

The reason for this is that when the through-holes are arranged in a matrix, a greater number of through-holes can be formed; hence, the connection resistance at the bonding portion between the corrosion resistant metal wire and the non-corrosion resistant metal wire can be further decreased, and in addition, the mechanical bonding force at the bonding portion can be significantly increased.

(v) Line Width

In addition, as shown in FIGS. 6(*a*) and (*b*), a line width (W2) of the non-corrosion resistant metal wire 152 at the bonding portion 157 between the corrosion resistant metal wire 158 and the non-corrosion resistant metal wire 152 is preferably formed larger than a line width (W1) of the non-corrosion resistant metal wire 152 at a position other than the bonding portion.

The reason for this is that when the structure is formed in consideration of the line width of the non-corrosion resistant metal wire, in addition to the through-hole portions, the corrosion resistant metal wire and the non-corrosion resistant metal wire can be bonded to each other at the side surfaces of the corrosion resistant metal wire, and as a result, the connection resistance at the bonding portion between the corrosion resistant metal wire and the non-corrosion resistant metal wire can be further decreased.

4. Electrical Wiring Structure

Figure 7:
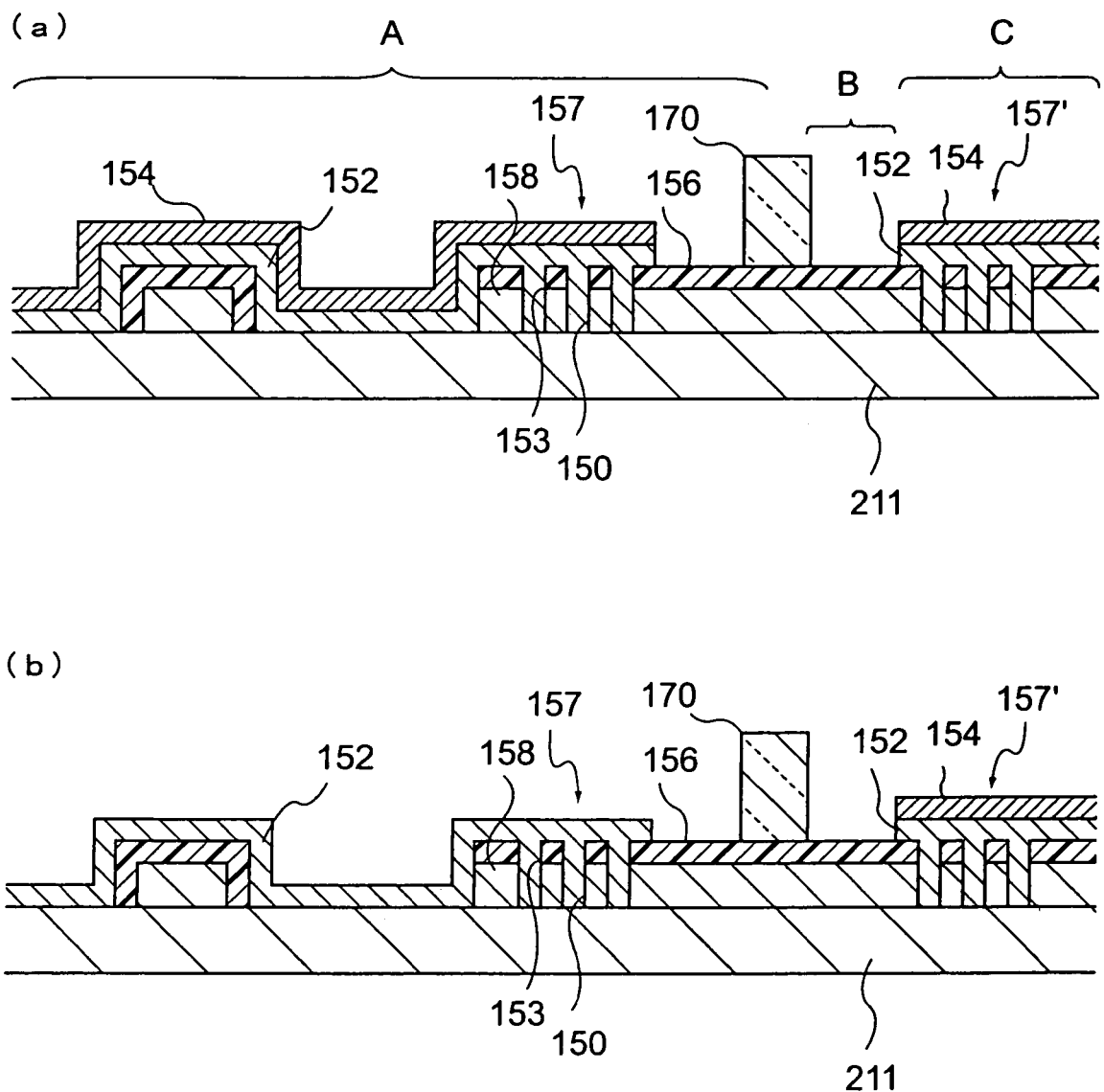
FIGS. 7(a) and (b) are views for illustrating a plurality of bonding portions.
Figure 8:
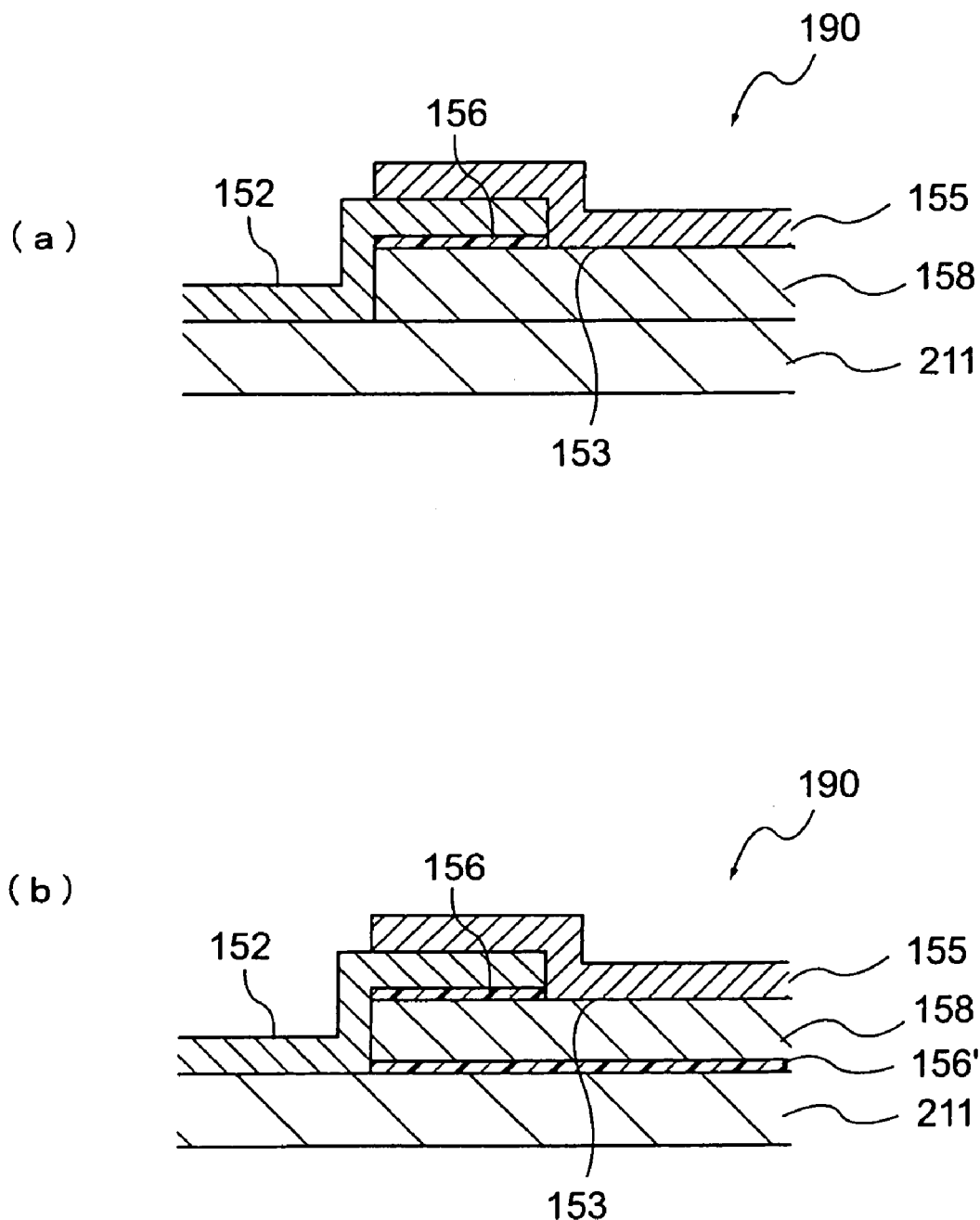
FIGS. 8(a) and (b) are views for illustrating an electrical wiring structure according to a second embodiment.

In addition, as for the electrical wiring structure, besides the oxide layer of the corrosion resistant metal wire formed on the surface thereof, a plurality of bonding portions between the corrosion resistant metal wire and the non-corrosion resistant metal wire is preferably formed. That is, as shown in FIG. 7, two bonding portions (first bonding portion 157 and a second bonding portion 157') between the corrosion resistant metal wire 158 and the non-corrosion resistant metal wire 152 are preferably formed. Accordingly, at each bonding portion, the through-holes 150 penetrating the oxide layer 156 of the corrosion resistant metal wire are formed. Next, the non-corrosion resistant metal wires 152 are formed to extend inside these through-holes 150 and also preferably electrically connected to a corrosion resistant metal wire different from the corrosion resistant metal wire 158 at the bonding portions 157 and 157' or a corrosion resistant metal wire integrally formed with the aforementioned different corrosion resistant metal wire.

The reason for this is as follows. When a plurality of bonding portions is formed as described above, metal wires having corrosion resistance can be formed in a region B in which corrosion is liable to occur, and metal wires having a relatively low electrical resistance can be formed in a region A in which corrosion is unlikely to occur. In addition, in a region C in which mounting of elements and the like is performed, when chromium or ITO is used, an electrical wiring structure can be formed which is capable of forming highly; reliable electrical connection.

In addition, it is also preferable that the structure of the first bonding portion be slightly different from that of the second bonding portion. That is, as shown in FIG. 7(b), the surface of the non-corrosion resistant metal wire 152 at the first bonding position 157 is untreated, and on the other hand, the conductive inorganic oxide film 154 is preferably formed on the surface of the non-corrosion resistant metal wire 152 at the second bonding position 157' in order to further improve the corrosion resistance.

The reason for this is that when a plurality of bonding portions, having the structures different from each other, is formed, arrangement of the wires can be performed in accordance with various corrosive environments. For example, at the interior of the seal material provided for the electro-optical device, the first bonding portion having a relatively simple structure is preferably formed, and at the exterior of the seal material subjected to a harsh corrosive environment, the second bonding portion having superior corrosion resistance is preferably formed.

Second Embodiment

The second embodiment is a modified example of the first embodiment, in which as the electrical connection auxiliary member, the exposed portion 153 is formed by removing the oxide layer 156 of the corrosion resistant metal, and the conductive inorganic oxide film 155 is formed on the non-corrosion resistant metal wire 152 and the exposed portion 153. Hereinafter, points different from those of the first embodiment will be primarily described.

1. Corrosion Resistant Metal Wire and Non-Corrosion Resistant Metal Wire

Materials, line widths, thicknesses, and relationship with the seal material of the corrosion resistant metal wire and the non-corrosion resistant metal wire may be set equivalent to those described in the first embodiment.

Figure 9:
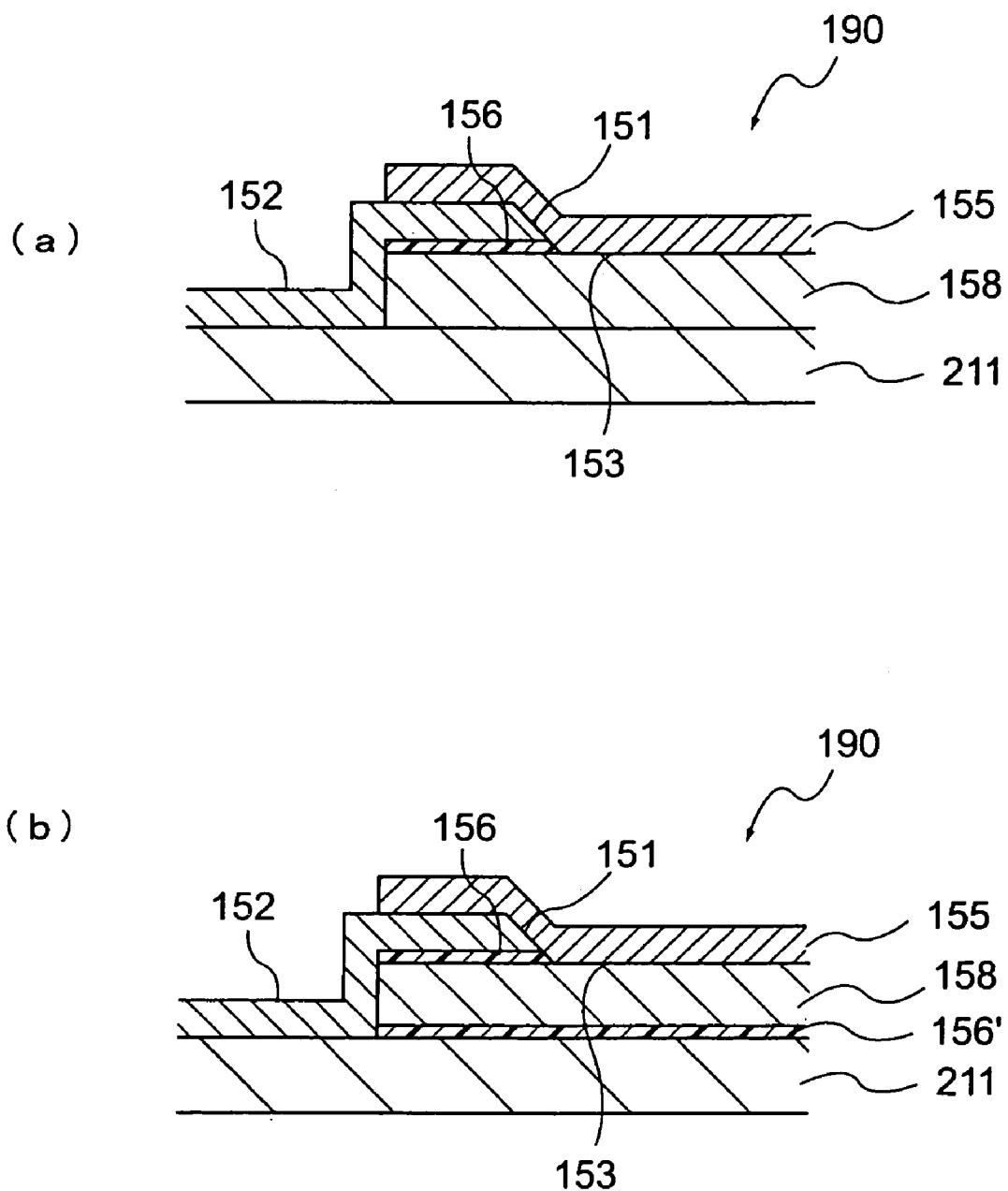
FIGS. 9(a) and (b) are views for illustrating the relationship between a seal material and an electrical wiring structure of an electro-optical device according to the second embodiment.

However, in this embodiment, as shown in FIGS. 9(a) and (b), the non-corrosion resistant metal wire 152 preferably has an inclined side surface 151. In the case described above, the angle thereof with respect to the direction parallel to the substrate is preferably set in the range of from 30° to 85°.

The reason for this is that when the angel of the inclined side surface is less than 30°, it becomes difficult to form the side surface with superior accuracy. On the other hand, when the angle of the inclined side surface is more than 85°, bonding of the non-corrosion resistant metal wire to the corrosion resistant metal wire with the conductive inorganic oxide film becomes difficult, and as a result, the connection resistance may be increased in some cases.

Hence, the angle of the inclined side surface of the non-corrosion resistant metal wire is more preferably set in the range of from 40° to 850 and even more preferably set in the range of from 60° to 80°.

Figure 10:
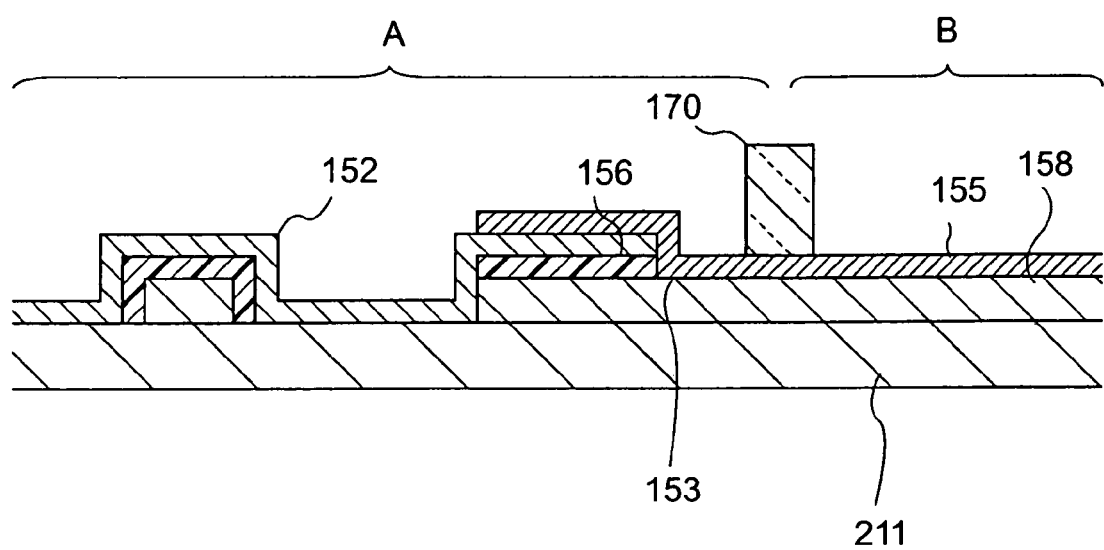
FIG. 10 is a view for illustrating another electrical wiring structure of the electro-optical device substrate according to the second embodiment.

In addition, as shown in FIG. 10, it is preferable that, for the exterior wiring (portion B) outside the seal material 170 subjected to a harsh corrosive environment, the corrosion resistant metal wire 158 covered with the conductive inorganic oxide film 155 be also provided.

2. Electrical Connection Auxiliary Member (1) Material

As a material for the electrical connection auxiliary member, that is, as a material for the conductive inorganic oxide film formed on the non-corrosion resistant metal wire and the exposed portion, for example, in particular, polycrystal indium tin oxide, amorphous indium tin oxide, amorphous indium zinc oxide, amorphous indium germanium oxide, and the like may be used alone or in combination.

In particular, since having superior transparency and electrical conductivity and being stably formed, polycrystal indium tin oxide is a preferable material.

(2) Thickness

In addition, the thickness of the conductive inorganic oxide film used as the electrical connection auxiliary member is preferably set in the range of from 0.01 to 0.3 μm.

The reason for this is that when the thickness of the conductive inorganic oxide film is less than 0.01 μm, although the coating film is provided, the thin film resistance may be excessively increased in some cases. On the other hand, when the thickness of the conductive inorganic oxide film is more than 0.3 μm, it may become difficult in some cases to optionally place wires on an electro-optical device substrate or to perform etching with superior accuracy.

Hence, in order to obtain thin film resistance and etching properties well balanced therewith, the thickness of the conductive inorganic oxide film used as the electrical connection auxiliary member is more preferably set in the range of from 0.05 to 0.25 μm and even more preferably set in the range of from 0.1 to 0.2 μm.

Third Embodiment

Figure 11:
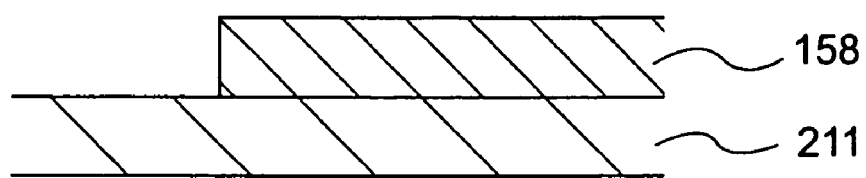
FIGS. 11(a) to (d) are views for illustrating a manufacturing method of an electrical wiring structure according to a third embodiment.
Figure 11:
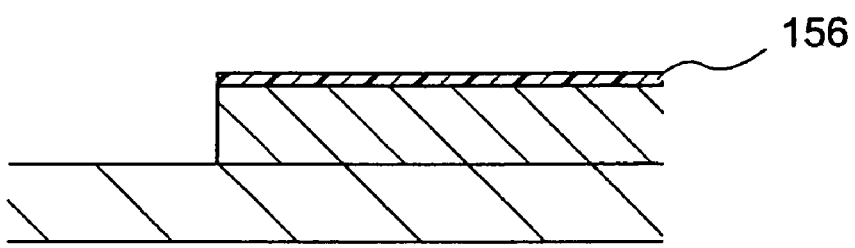
Figure 11:
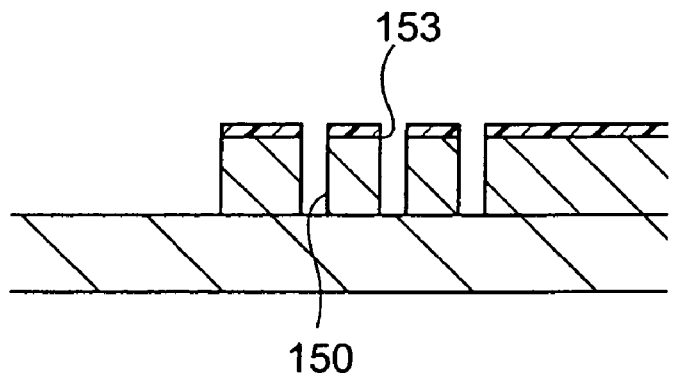
Figure 11:
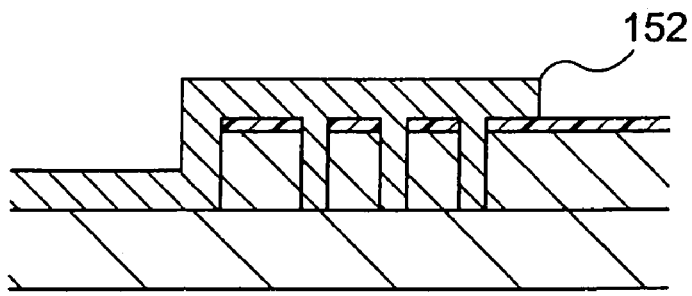
Figure 12:
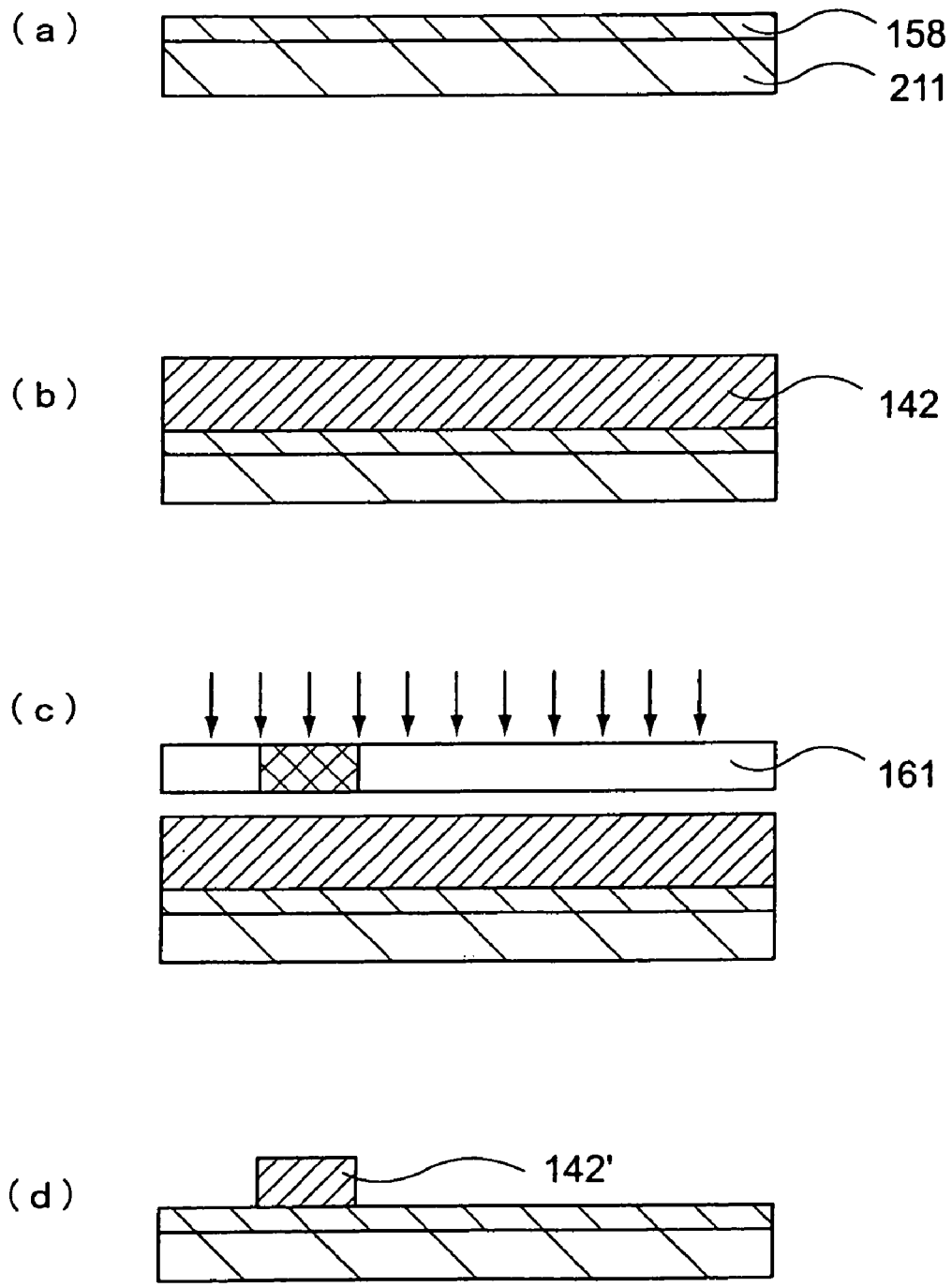
FIGS. 12(a) to (d) are views for illustrating a manufacturing method of a TFD (part 1).
Figure 13:
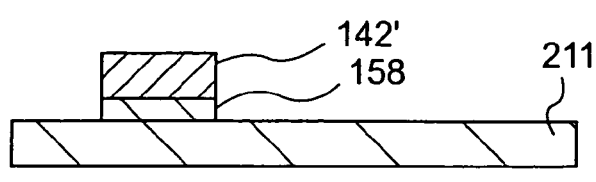
FIGS. 13(a) to (c) are views for illustrating a manufacturing method of a TFD (part 2).
Figure 13:
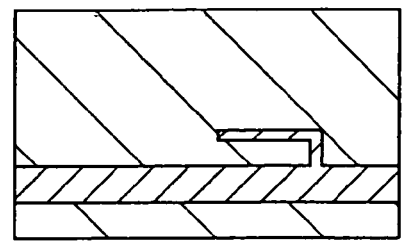
Figure 13:
Figure 13:
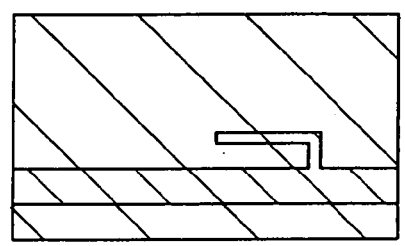
Figure 13:
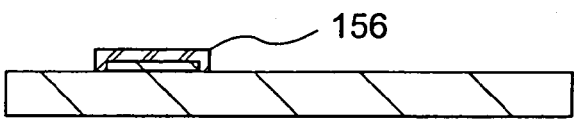
Figure 13:
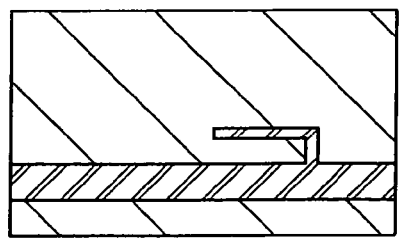

As shown in FIG. 11 by way of example, a third embodiment relates to a method for manufacturing the electrical wiring structure 100 for electrically connecting between the corrosion resistant metal wire 158 and the non-corrosion resistant metal wire 152, the manufacturing method comprising the following steps (A) to (C).

(A) The step of forming a corrosion resistant metal wire on an electrical insulating substrate, followed by the formation of an oxide layer of a corrosion resistant metal on the surface of the corrosion resistant metal wire (hereinafter referred to as "step of forming a corrosion resistant metal wire" in some cases).

(B) The step of forming a through-hole as an electrical connection auxiliary member penetrating at least the oxide layer of the corrosion resistant metal at a position at which the corrosion resistant metal wire and a non-corrosion resistant metal wire are to be bonded to each other (hereinafter referred to as "step of forming a through-hole" in some cases).

(C) The step of forming the non-corrosion resistant metal wire which extends inside the through-hole (hereinafter referred to as "step of forming a non-corrosion resistant metal wire" in some case).

In this embodiment, tantalum and chromium are described as the corrosion resistant metal and the non-corrosion resistant metal, respectively, by way of example; however, other corrosion resistant metals and non-corrosion resistant metals may also be preferably used.

1. (A) Step of Forming Corrosion Resistant Metal Wire

As shown in FIG. 11(a), a method for forming a tantalum wire 158 having a predetermined shape on an electrical insulating substrate 211 is not particularly limited; however, for example, after a tantalum layer is formed over the entire surface by a deposition method, a sputtering method, or a lamination method, the tantalum wire 158 is preferably formed using a photolithographic method.

Next, as shown in FIG. 11(b), by oxidizing a surface of the tantalum wire 158, a tantalum oxide layer 156 is preferably formed. By the formation of the tantalum oxide layer described above, predetermined electrical insulating properties are obtained, and in addition, adhesion with a chromium wire formed in a subsequent step can be improved.

In addition, in forming the tantalum wire having a predetermined shape on the electrical insulating substrate, in order to simplify the manufacturing process, as shown in FIGS. 12(a) to 13(b), it is more preferable that when tantalum electrodes 158 of the first element and the second element forming a TFD are formed, the tantalum wire be simultaneously formed.

In addition, also in order to simplify the manufacturing process, in forming the oxide tantalum layer on the tantalum wire having a predetermined shape, as shown in FIG. 13(c), it is more preferable that when tantalum oxide layer 156 of the first element and the second element forming a TFD is formed by anodization, or when an anodized layer formed by anodization is subsequently processed by thermal treatment for thermal oxidation, the tantalum oxide layers be simultaneously formed.

(B) Step of Forming Through-Hole

Next, as shown in FIG. 11(c), at a position at which the tantalum wire (corrosion resistant metal wire) 158 and the chromium wire (non-corrosion resistant metal wire) 152 are to be bonded to each other, by mechanical milling or chemical etching such as dry etching, the through-holes 150 penetrating at least the tantalum oxide layer 156 are preferably formed.

Figure 14:
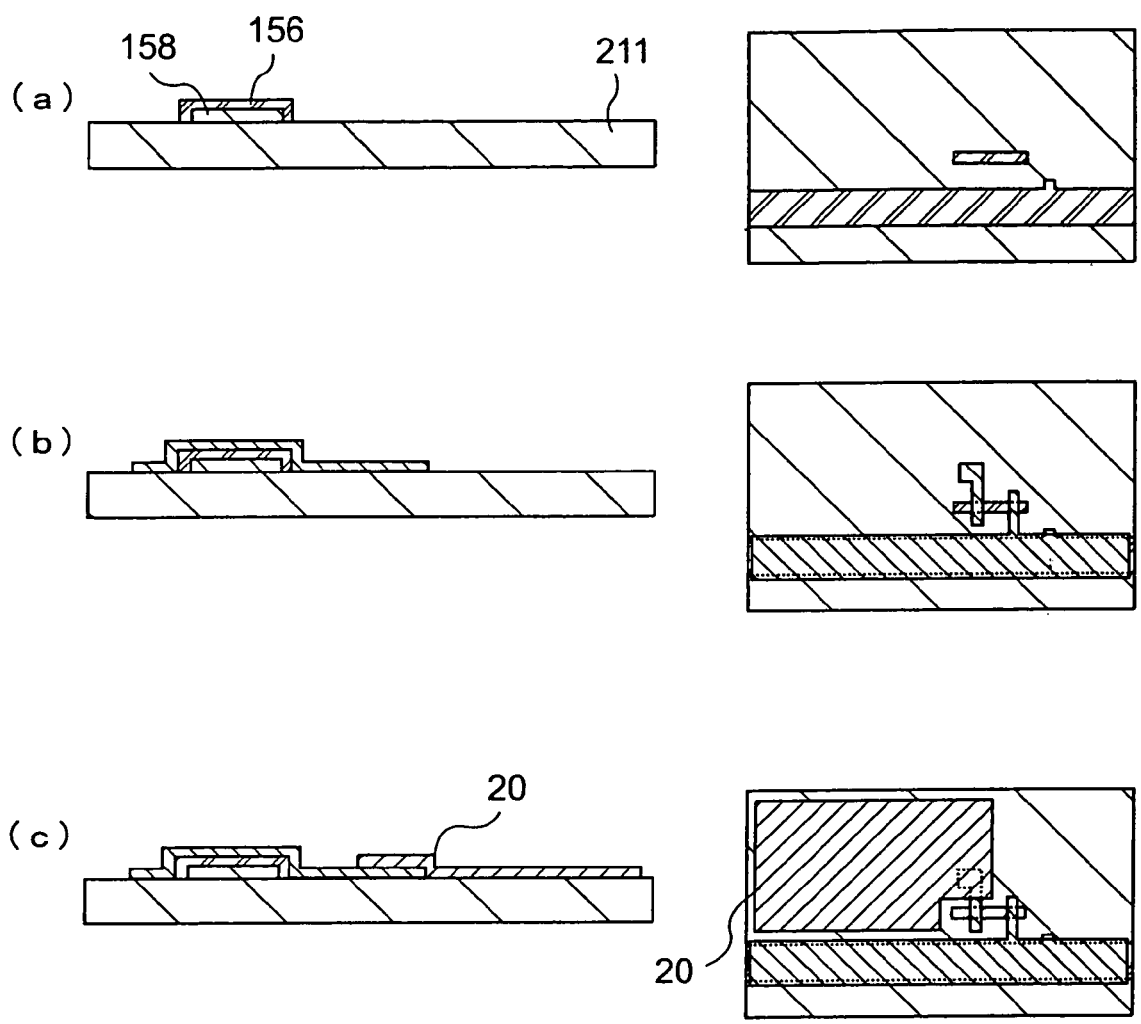
FIGS. 14(a) to (c) are views for illustrating a manufacturing method of a TFD (part 3).

In addition, in order to simplify the manufacturing process, in forming the through-holes penetrating the tantalum oxide layer, it is more preferable that when the oxide tantalum layer 156 and the tantalum wires 158 of the first and the second elements forming a TFD are formed by etching as shown in FIG. 14(a), the through-holes be simultaneously formed as the electrical connection auxiliary member.

3. (C) Step of Forming Non-Corrosion Resistant Metal Wire

Next, as shown in FIG. 11(d), the chromium wire 152 is preferably formed by a deposition method or a sputtering method in combination with a photolithographic method.

In addition, the chromium wire 152 is preferably formed to extend inside the through-holes 150.

In order to simplify the manufacturing process, in forming the chromium wire having a predetermined shape at a predetermined position of the electrical insulating substrate, it is more preferable that when chromium wires 152 of the first element and the second element forming a TFD are formed as shown in FIG. 14(b), the chromium wires be simultaneously formed.

Fourth Embodiment

A fourth embodiment relates to a method for manufacturing an electrical wiring structure for electrically connecting between a corrosion resistant metal wire and a non-corrosion resistant metal wire, the manufacturing method comprising the following steps (A') to (D').

(A') The step of forming a corrosion resistant metal wire on a substrate, followed by the formation of an oxide layer of a corrosion resistant metal on the surface of the corrosion resistant metal wire (hereinafter referred to as "step of forming a corrosion resistant metal wire" in some cases).

(B') The step of forming a non-corrosion resistant metal wire so as to overlap a part of the oxide layer of the corrosion resistant metal (hereinafter referred to as "step of forming a non-corrosion resistant metal wire" in some cases).

(C') The step of removing a part of the oxide layer of the corrosion resistant metal at a position other than that at which the non-corrosion resistant metal wire is provided so as to form an exposed portion (hereinafter referred to as "step of forming an exposed portion" in some case).

(D') The step of forming a conductive inorganic oxide film as an electrical connection auxiliary member on the non-corrosion resistant metal wire and the exposed portion (hereinafter referred to as "step of forming a conductive inorganic oxide film" in some cases).

In this embodiment, tantalum and chromium are described as the corrosion resistant metal and the non-corrosion resistant metal, respectively, by way of example; however, other corrosion resistant metals and non-corrosion resistant metals may also be preferably used.

1. (A') Step of Forming Corrosion Resistant Metal Wire

Figure 15:
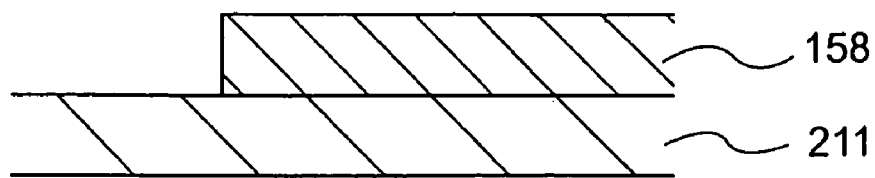
FIGS. 15(a) to (e) are views for illustrating a manufacturing method of an electrical wiring structure according to a fourth embodiment.
Figure 15:
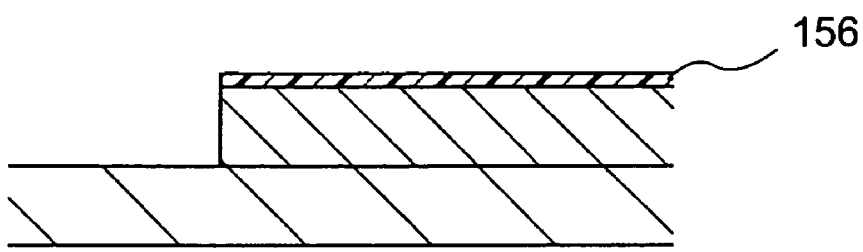
Figure 15:
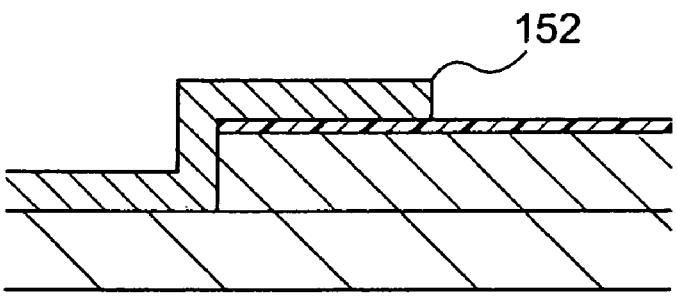
Figure 15:
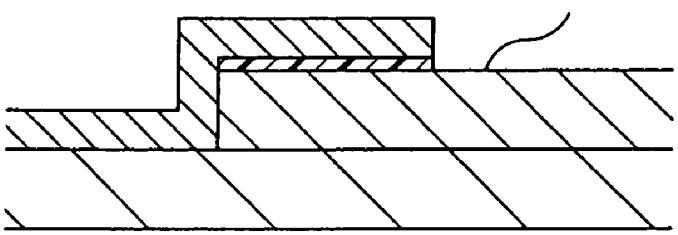
Figure 15:
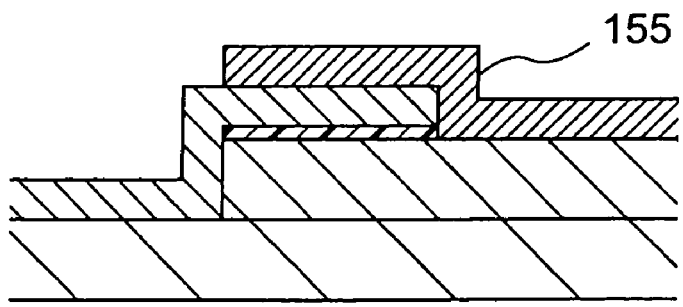

As shown in FIGS. 15(a) and (b), by the same method as that described in the third embodiment, the tantalum wire 158 is preferably formed.

In this embodiment, in order to simplify the manufacturing process, it is more preferable that when the tantalum electrodes and the tantalum oxide layer of the first and the second elements forming a TFD are formed, the tantalum wire and the tantalum oxide layer be simultaneously formed.

2. (B') Step of Forming Non-Corrosion Resistant Metal Wire

As shown in FIG. 15(c), by the same method as that described in the third embodiment, the chromium wire 152 is preferably formed.

In this embodiment, in order to simplify the manufacturing process, it is more preferable that when the chromium electrodes of the first and the second elements forming a TFD are formed, the chromium wire be simultaneously formed.

3. (C') Step of Forming Exposed Portion

Next, as shown in FIG. 15(d), when the tantalum oxide layer 156 is removed to form the exposed portion 153 of the tantalum wire 158, dry etching is preferably performed using a mixed gas containing $SF_6$ and $O_2$ in a plasma state.

4. (D') Step of Forming Conductive Inorganic Oxide Film

Next, as shown in FIG. 15(e), when the conductive inorganic oxide film 155 is formed on the chromium wire 152 and the exposed portion 153, a deposition method or a sputtering method is preferably used.

In this embodiment, in order to simplify the manufacturing process, after the chromium electrodes of the first and the second elements forming a TFD are formed, when a conductive inorganic oxide film used as a pixel electrode is formed, it is more preferably that the conductive inorganic oxide film used as the electrical connection auxiliary member of the electrical wiring structure be simultaneously formed.

Fifth Embodiment

A fifth embodiment relates to a pair of electro-optical device substrates used for an electro-optical device, the pair of substrates comprising a first electro-optical device substrate and a second electro-optical device substrate facing thereto, and relates to an electro-optical device using said pair of electro-optical device substrates. The first electro-optical device substrate comprises a first glass substrate used as a substrate and electrical wires provided thereon. The second electro-optical device substrate comprises: a second glass substrate used as a counter substrate; and first electrodes, insulating films, and second electrodes, which form two-terminal non-linear elements. In addition, the first electro-optical device substrate and the second electro-optical device substrate form the electro-optical device.

In addition, the second electro-optical device substrate is an electro-optical device substrate comprises electrical wiring structures each having an electrical connection auxiliary member, in which corrosion resistant metal wires formed on the second glass substrate are electrically connected to non-corrosion resistant metal wires to be electrically connected to the first electrodes and the second electrodes.

Hereinafter, a color filter substrate (first electro-optical device substrate), a counter substrate (second electro-optical device substrate) provided with two-terminal non-linear elements, and a liquid crystal panel using the above substrates will be described by way of example.

1. Basic Structure of Liquid Crystal Panel

Figure 16:
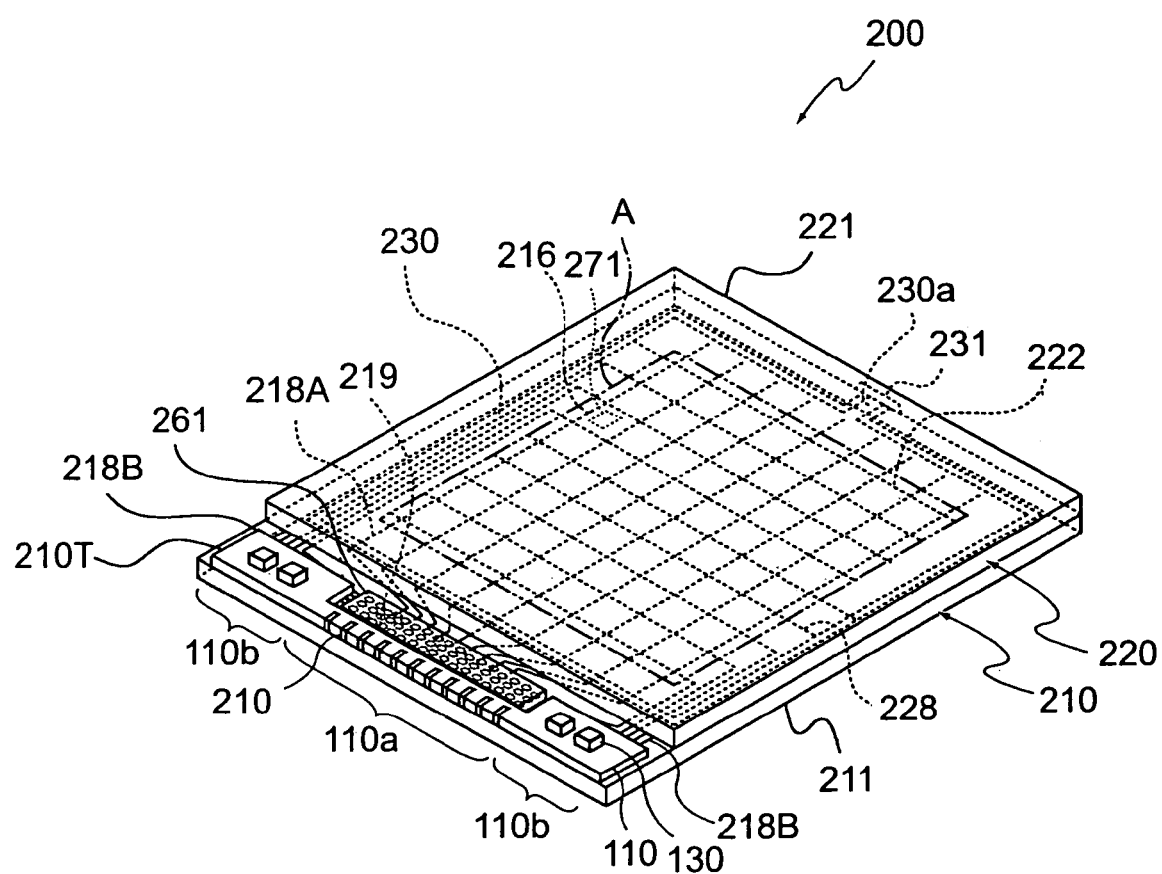
FIG. 16 is a schematic perspective view showing the appearance of a liquid crystal panel according to a fifth embodiment.
Figure 17:
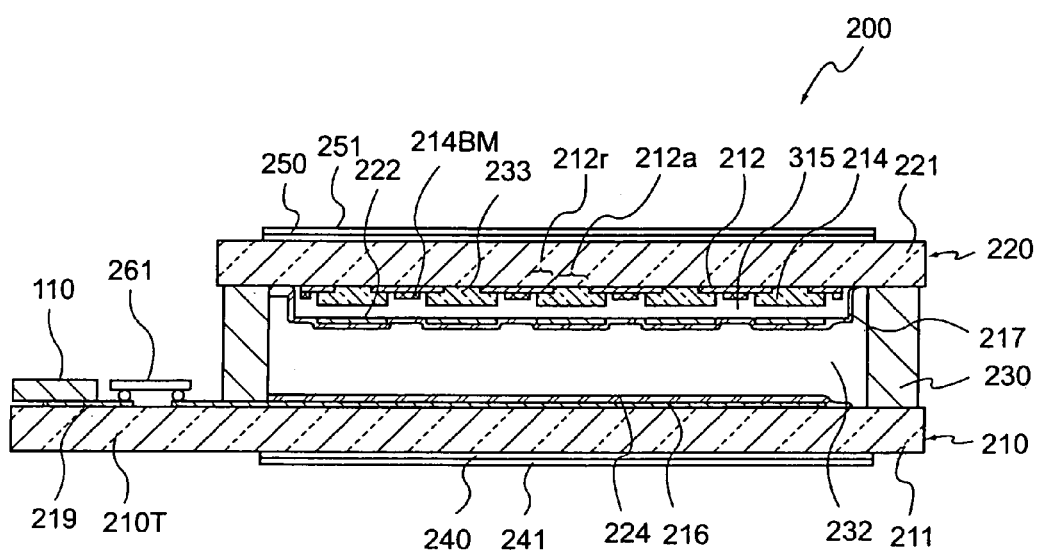
FIG. 17 is a schematic cross-sectional view showing a panel structure according to the fifth embodiment.
Figure 18:
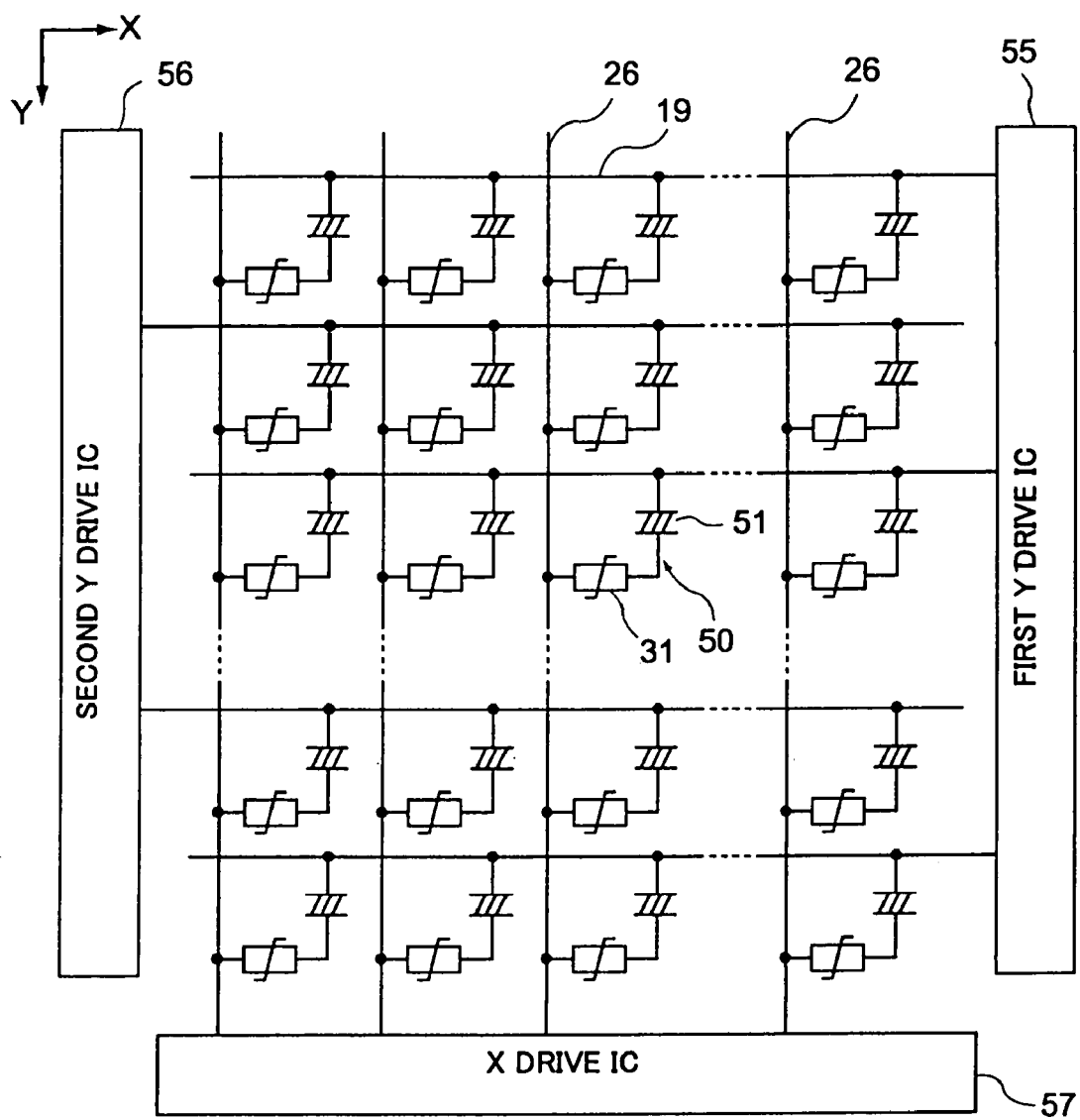
FIG. 18 is a view for illustrating electrical wiring of a TFD.
Figure 19:
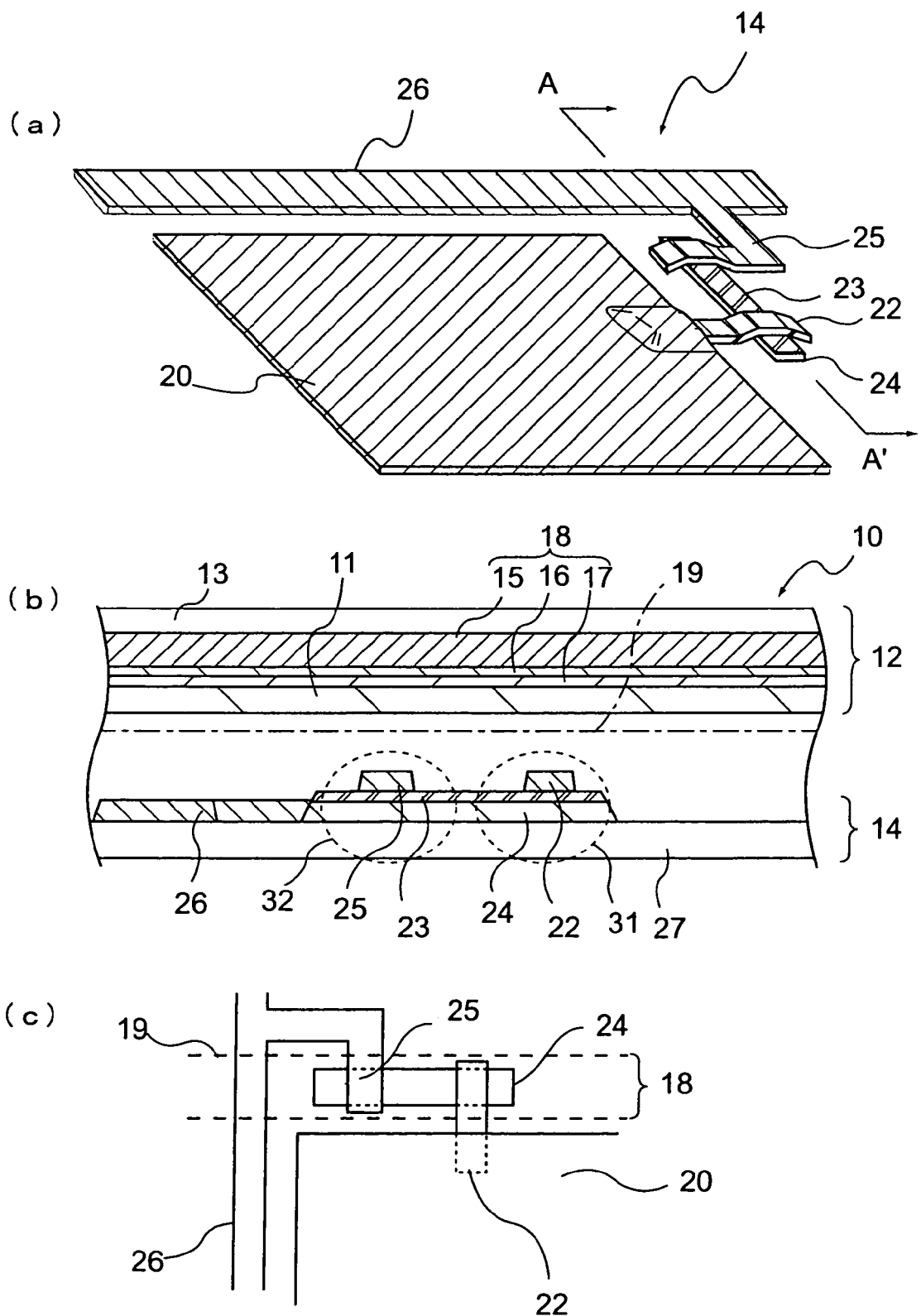
FIGS. 19(a) to (c) are views for illustrating the structure of a TFD (part 1).
Figure 20:
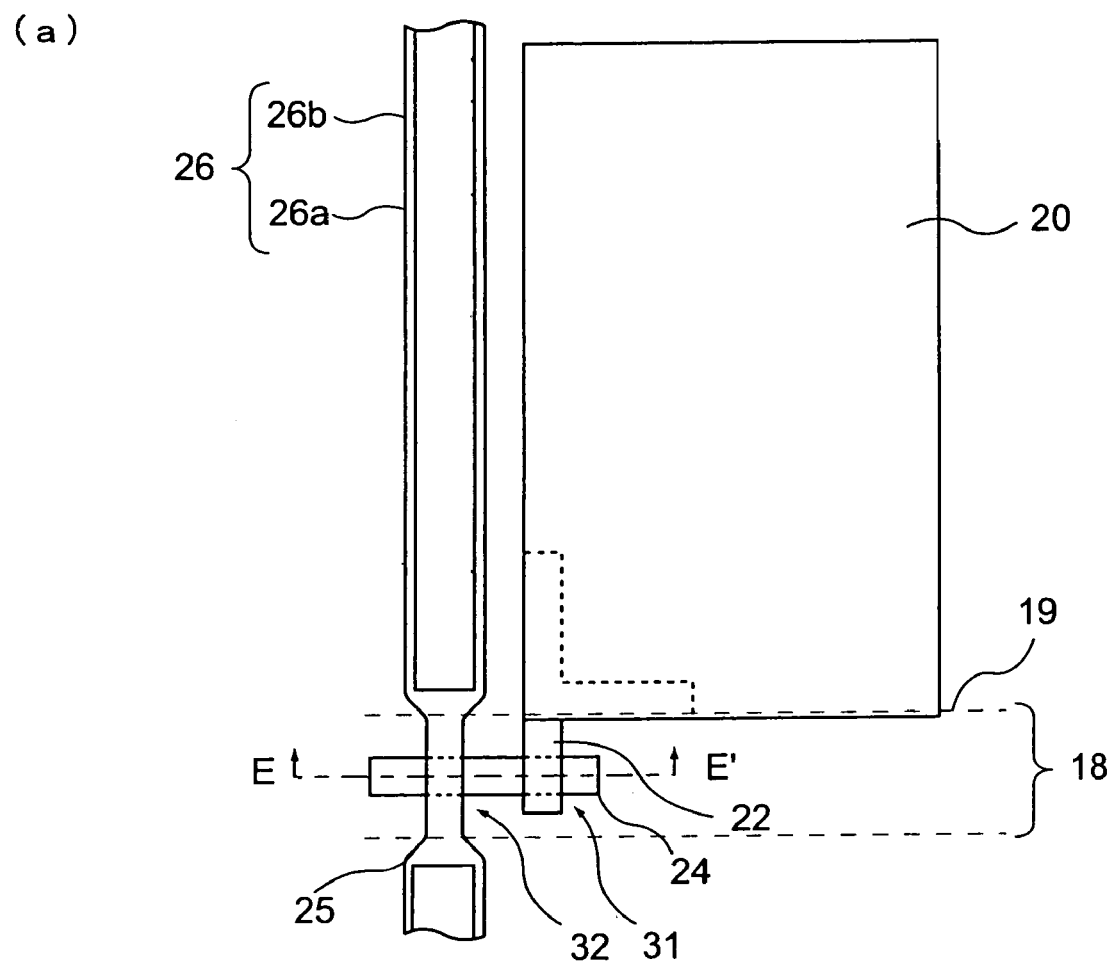
FIGS. 20(a) and (b) are views for illustrating a TFD (part 2).
Figure 20:
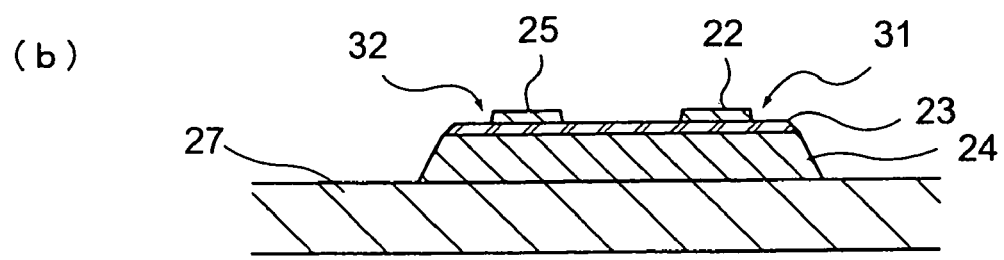

First, with reference to FIGS. 16 to 20, a basic structure of an electro-optical device will be described in detail which uses the electro-optical device substrates of the fifth embodiment according to the present invention, the basic structure including a cell structure, wires, a retardation film, and a polarizer. FIG. 16 is a schematic perspective view showing the appearance of a liquid crystal panel 200 forming an electro-optical device of the present invention; FIG. 17 is a schematic cross-sectional view of the liquid crystal panel 200; FIG. 18 is a view showing an electrical structure of an active matrix wiring; and FIGS. 19 and 20 are views for illustrating the structure of a TFD (thin film diode) as a two-terminal non-linear element.

In addition, the liquid crystal panel 200 forming the electro-optical device shown in FIG. 16 is a liquid crystal panel 200 having an active matrix structure using TFDs, and although not shown in the figure, it is preferable that luminescent devices such as a backlight or a front light or a case body be optionally provided for the panel whenever necessary.

(1) Cell Structure

As shown in FIG. 16, in the liquid crystal panel 200, a color filter substrate 220 (which is called "first electro-optical device substrate" in some cases) and a counter substrate 210 (which is called "second electro-optical device substrate" in some cases) facing thereto are preferably bonded to each other with a seal material 230 used as an adhesive or the like provided therebetween. The color filter substrate 220 is primarily composed of a transparent first glass substrate 221 (corresponding to a first glass substrate 13 in FIG. 19) made from a glass plate, a synthetic resin plate, or the like, and the counter substrate 210 is primarily composed of a second glass substrate 211 (corresponding to a second glass substrate 27 in FIG. 19). In addition, it is preferable that after a liquid crystal material 232 is supplied in a space formed between the color filter substrate 220 and the counter substrate 210 and inside the seal material 230 through an opening portion 230a, the space be sealed with a sealing material 231 to form a cell structure.

That is, as shown in FIG. 17, the liquid crystal material 232 is preferably filled between the color filter substrate 220 and the counter substrate 210.

(2) Wiring (i) Matrix

As shown in FIG. 16, it is preferable that on the interior surface (facing the first glass substrate 221) of the second glass substrate 211, transparent electrodes 216 arranged in a matrix and wires 218A and 218B be formed, and that on the interior surface of the first glass substrate 221, a plurality of strip transparent electrodes 222 be formed in the direction perpendicular to the transparent electrodes 216. In addition, it is preferable that the transparent electrodes 216 be electrically connected to the wires 218A via non-linear elements 271, and in addition, that the transparent electrodes 222 be electrically connected to wires 228.

The transparent electrodes 216 connected to the wires 218A perpendicular to the transparent electrodes 222 via the TFD elements 271 form a great number of pixels arranged in a matrix, and the arrangement of the great number of pixels forms a liquid crystal display region A as a whole.

In addition, in the electro-optical device substrates and the electro-optical device according to the fifth embodiment, the wire 218A preferably has the electrical wiring structure as described in the first or the second embodiment.

In addition, in FIG. 18, a particular example of the electrical structure of an active matrix wiring using drive ICs and TFD elements is shown. That is, a plurality of data electrodes 26 extending in the Y direction and a plurality of scanning electrodes 19 extending in the X direction form the structure, and at the intersections therebetween, pixels 50 are formed. In addition, in each pixel 50, a liquid crystal display element 51 and a TFD element 31 are connected to each other in series.

(ii) Input Terminal Portion

In addition, as shown in FIG. 16, it is preferable that the second glass substrate 211 have a protruding portion 210T protruding from the first glass substrate 221, and that on this protruding portion 210T, the wires 218B electrically connected to the wires 228 via vertical conduction portions formed of parts of the seal material 230 and an input terminal portion 219 composed of a plurality of wire patterns independent of each other be formed.

In addition, it is preferable that on the protruding portion 210T, a semiconductor IC 261 incorporating a liquid crystal drive circuit and the like be mounted so as to be electrically connected to the wires 218A, 218B, and the input terminal portion 219.

Furthermore, at the end portion of the substrate protruding portion 210T, a flexible circuit board 110 is preferably mounted so as to be electrically connected to the input terminal portion 219.

(3) Retardation Film and Polarizer

In the liquid crystal panel 200 shown in FIG. 16, a retardation film (¼ wavelength plate) 250 and a polarizer 251 are preferably disposed at predetermined positions of the first glass substrate 221 so that a clear image can be displayed.

In addition, on the exterior surface of the second glass substrate 211, a retardation film (¼ wavelength plate) 240 and a polarizer 241 are also preferably disposed.

2. Color Filter Substrate (First Electro-Optical Device Substrate)

(1) Basic Structure

Basically, as shown in FIG. 17, the color filter substrate 220 is preferably composed of the glass substrate 221, color layers 214, the transparent electrodes 222, and an alignment film 217.

In addition, when a reflection function is required for the color filter substrate 220, for example, in a transflective liquid crystal display device used for mobile phones or the like, it is preferable that a reflective layer 212 be provided between the glass substrate 221 and the color layers 214 as shown in FIG. 17.

Furthermore, in the color filter substrate 220, as shown in FIG. 17, a planarizing layer 315 for planarizing the surface of the substrate or an insulating layer for improving electrical insulation is also preferably provided.

(2) Color Layer (i) Structure

In addition, the color layers 214 shown in FIG. 17 are generally formed of coloring agents such as pigments or dyes dispersed in a transparent resin so as to exhibit predetermined colors. As color tones of the color layers, for example, there may be mentioned R (red), G (green), and B (blue) of the elementary color filter; however, in addition to those mentioned above, Y (yellow), M (magenta), C (cyan) of the complementary color system, and other various color tones may also be used.

In general, a color resist formed of a photosensitive resin containing a coloring agent such as a pigment or a dye is applied onto a substrate surface, and unnecessary parts are then removed by a photolithographic method, thereby forming a color layer having a predetermined pattern. When color layers having a plurality of color tones are formed, the step described above is repeated as required.

(ii) Shading Film

In addition, as shown in FIG. 17, in regions between the color layers 214 formed in the individual pixels, black matrix (black shading film, or is called a black mask in some cases) 214BM is preferably formed.

As the black matrix 214BM, for example, there may be mentioned a compound of a coloring agent such as a black pigment or dye dispersed in a base material such as a resin or a compound of three coloring agents, R (red), G (green), and B (blue), dispersed together in a base material such as a resin.

In the black matrix 214BM shown in FIG. 17, a three-layer structure of an R (red) layer 17, a G (green) layer 16, and a B (blue) layer 15 is formed using an additive color process. By the structure described above, without using a black color material such as carbon, a superior shading effect can be obtained.

(iii) Pattern of Arrangement

As the pattern of arrangement of the color layers, a stripe arrangement has been widely used, and in addition to this pattern, various patterns such as an oblique mosaic arrangement or a delta arrangement may also be used.

(3) Transparent Electrode

As shown in FIG. 17, the transparent electrodes 222 of a transparent conductive material such as ITO (indium tin oxide compound) are preferably formed on the planarizing layer 315. As the transparent electrodes 222, strip transparent electrodes 222 are preferably disposed in parallel to each other.

(4) Alignment Film

In addition, as shown in FIG. 17, on the transparent electrodes 222, the alignment film 217 made of a polyimide resin or the like is preferably formed.

The reason for this is that by using the alignment film 217 as described above, when the color filter substrate 220 is used for a liquid crystal display device or the like, the orientation of the liquid crystal material can be easily controlled by applying a voltage.

3. Counter Substrate (Second Electro-Optical Device Substrate)

(1) Basic Structure

In addition, as shown in FIGS. 16 and 17, the other substrate, i.e., the counter substrate (second electro-optical device substrate) 210, facing the color filter substrate 220 is preferably formed of the transparent electrodes 216 and the alignment film 224 sequentially provided on the second glass substrate 211 made of a glass or the like as is the case of the first glass substrate.

In the color filter substrate 220 described by way of example, the color layers are provided on the first glass substrate 221; however, it is also preferable that the color layers be provided on the second glass substrate 211 of the counter substrate 210.

(2) Two-Terminal Non-Linear Element

As a two-terminal non-linear element, as shown in FIGS. 19 and 20, TFD elements 31 and 32 may be mentioned as a typical example.

The TFD elements 31 and 32 mentioned above preferably have sandwich structures composed of a first metal film 24 as a first electrode, an insulating film 23, and second metal films 22 and 25 as a second electrode. In this element, as the first metal film 24 and the second metal films 22 and 25, tantalum (Ta) is preferably used. In addition, the insulating film 23 is preferably formed by anode oxidation of the metal material mentioned above, and for example, tantalum oxide ($Ta_2O_5$) is preferably used.

In addition, an active element is obtained which has positive and negative bidirectional diode switching characteristics, and when a voltage not less than a threshold value is applied between the first metal film 24 and the second metal films 22 and 25, the conduction state is obtained.

In addition, as for the arrangement of the two-terminal non-linear element, as shown in FIG. 19(c), the two TFD elements 31 and 32 are preferably formed on the glass substrate 27 so as to be present between a pixel electrode 20 and a scanning electrode 19 or a data electrode 26, and the first TFD element 32 and the second TFD element 31, having diode characteristics opposite to each other, are preferably used.

The reason for this is that when the structure described above is formed, as a voltage waveform to be applied, positive and negative pulse waveforms, which are symmetrical to each other, may be used, and hence degradation of liquid crystal material used for liquid crystal display devices or the like can be prevented. That is, in order to prevent the degradation of liquid crystal material, it is desired that the diode switching characteristics in the positive and the negative directions be symmetrical, and as shown in FIG. 14(b) by way of example, when the two TFD elements 31 and 32 are connected to each other in reverse relation, positive and negative pulse waveforms, which are symmetrical to each other, can be used.

(3) Electrical Wiring Structure

As has thus been described, the electrical wiring structure 100 described in the first embodiment is preferably employed which electrically connects between the corrosion resistant metal wire 158 and the non-corrosion resistant metal wire 152. This electrical wiring structure 100 is formed, for example, by the steps of: forming the oxide layer 156 of the corrosion resistant metal wire on the surface of the corrosion resistant metal wire 158; forming the through-holes 150 as the electrical connection auxiliary member penetrating at least the oxide layer 156 at a position at which the bonding portion between the corrosion resistant metal wire 158 and the non-corrosion resistant metal wire 152 is to be formed; and forming the non-corrosion resistant metal wire 152 which extends inside the through-holes 150 so that the corrosion resistant metal wire 158 and the non-corrosion resistant metal wire 152 are electrically connected to each other.

In addition, the electrical wiring structure 100 described in the second embodiment is also preferably employed. The electrical wiring structure 100 is formed by the steps of: forming the exposed portion 153 as the electrical connection auxiliary member by removing the oxide layer 156 of the corrosion resistant metal; and forming the conductive inorganic oxide film 155 on the non-corrosion resistant metal wire 152 and the exposed portion 153 so that the electrical connection is obtained between the corrosion resistant metal wire 158 and the non-corrosion resistant metal wire 152.

Sixth Embodiment

In a sixth embodiment, the case will be described in detail in which an electro-optical device of this embodiment according to the present invention is used as a display device of an electronic apparatus.

Figure 21:
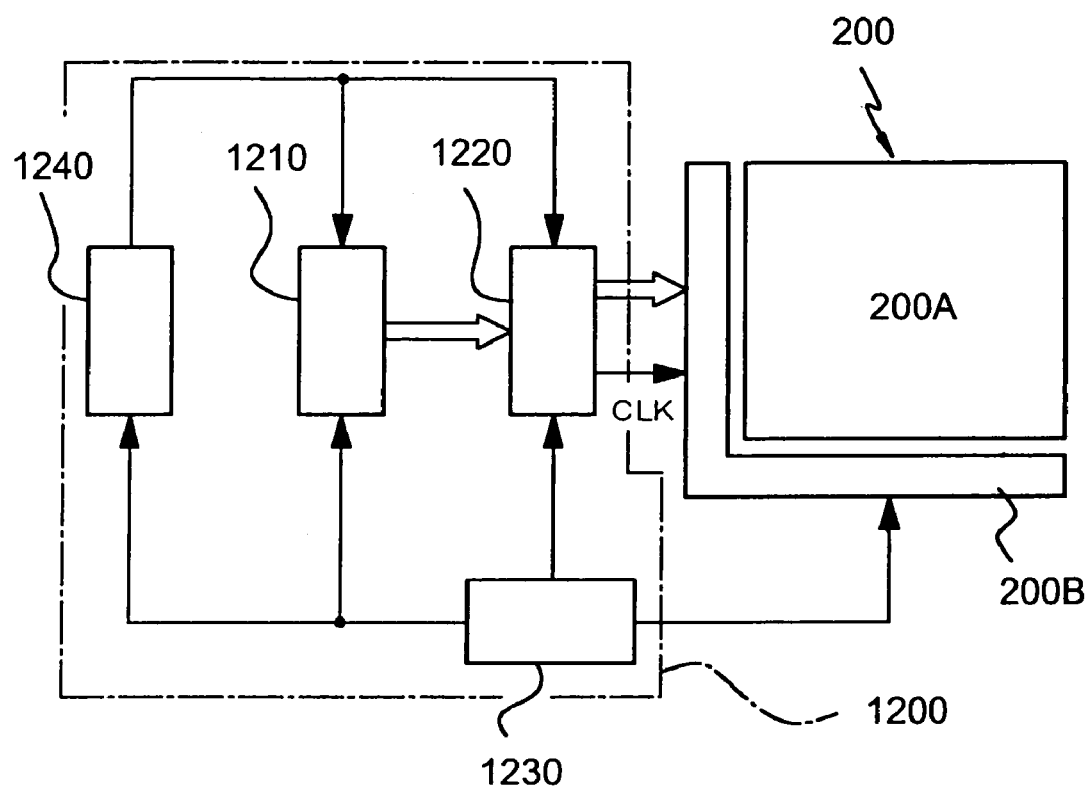
FIG. 21 is a schematic view showing a block diagram of an electronic apparatus according to an embodiment of the present invention.

FIG. 21 is a schematic view showing the entire structure of the electronic apparatus of this embodiment. This electronic apparatus has the liquid crystal panel 200 and a control device 1200 for controlling the panel. In addition, FIG. 21 shows the liquid crystal panel 200 which is conceptually divided into a panel structure 200A and a drive circuit 200B including semiconductor ICs and the like. In addition, the control device 1200 is preferably composed of a display information output source 1210, a display information processing circuit 1220, an electrical power circuit 1230, and a timing generator 1240.

In addition, it is preferable that the display information output source 1210 have memories including ROMs (read only memory), RAMs (random access memory), and the like; a storage unit including a magnetic recording disk, an optical recording disk, and the like; and a tuning circuit which tunes and outputs digital image signals. In addition, the display information output source 1210 is preferably formed so that, in response to various clock signals generated by the timing generator 1240, display information in the form of image signal or the like in accordance with a predetermined format is supplied to the display information processing circuit 1220.

In addition, the display information processing circuit 1220 have various known circuits including a serial-parallel converter, an amplification inversion circuit, a rotation circuit, a gamma correction circuit, a clamp circuit, and the like. After processing input display information, the display information processing circuit 1220 preferably supplies the image information to the drive circuit 200B together with clock signal CLK. Furthermore, the drive circuit 200B preferably includes a scanning line drive circuit, a data line drive circuit, and an inspection circuit. In addition, the electrical power circuit 1230 functions to supply predetermined voltages to the aforementioned constituent elements.

Industrial Applicability

As electronic apparatuses which may use an electro-optical device having the electrical wiring structure of the present invention as a liquid crystal display device, for example, personal computers and mobile phones may first be mentioned. In addition to the above electronic apparatuses, for example, there may also be mentioned liquid crystal televisions, viewfinder type or direct viewing type video tape recorders, car navigation systems, pagers, electrophoretic devices, electronic notebooks, electronic calculators, word processors, work stations, television phones, POS terminals, and electronic apparatuses provided with a touch panel.

Furthermore, the electro-optical devices and the electronic apparatuses of the present invention are not limited to the above examples, and it is to be understood that various modification will be made without departing from the spirit and the scope of the present invention.

Figure 22:
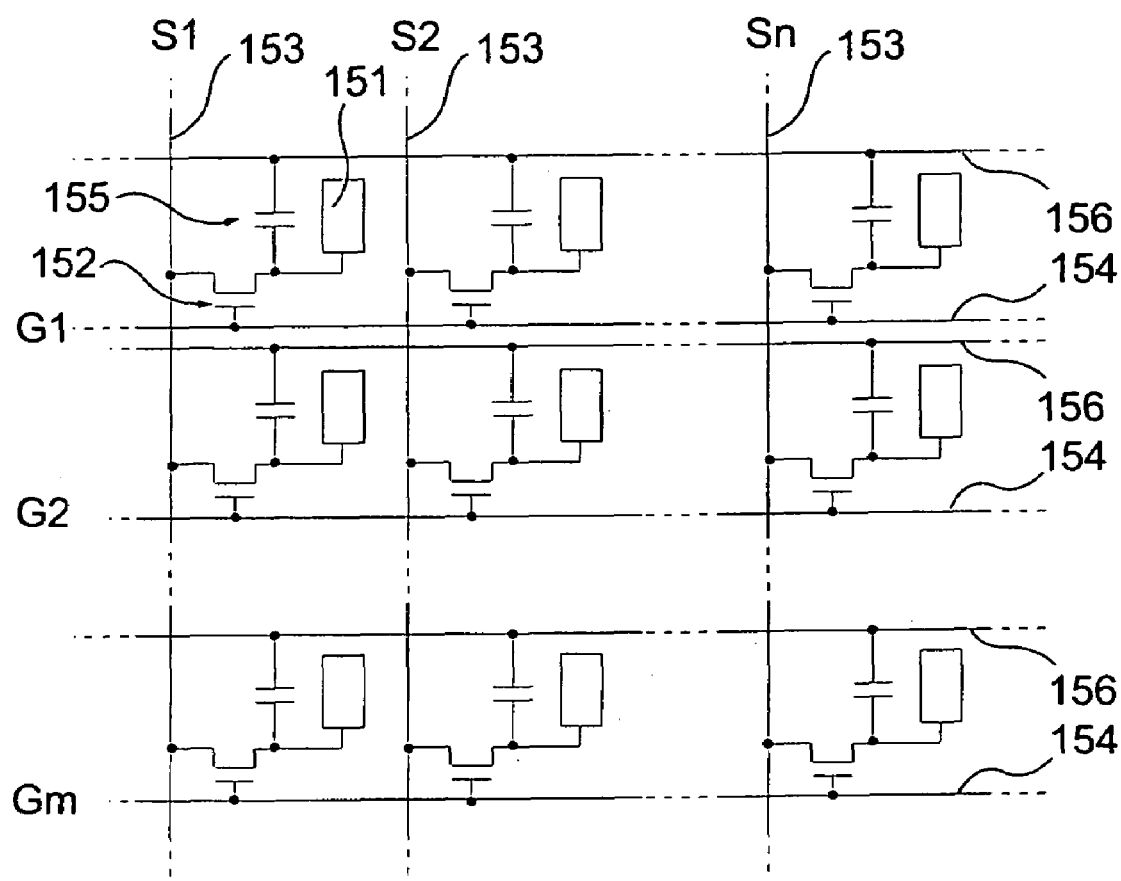
FIG. 22 is a view for illustrating electrical wiring of a TFT.
Figure 23:
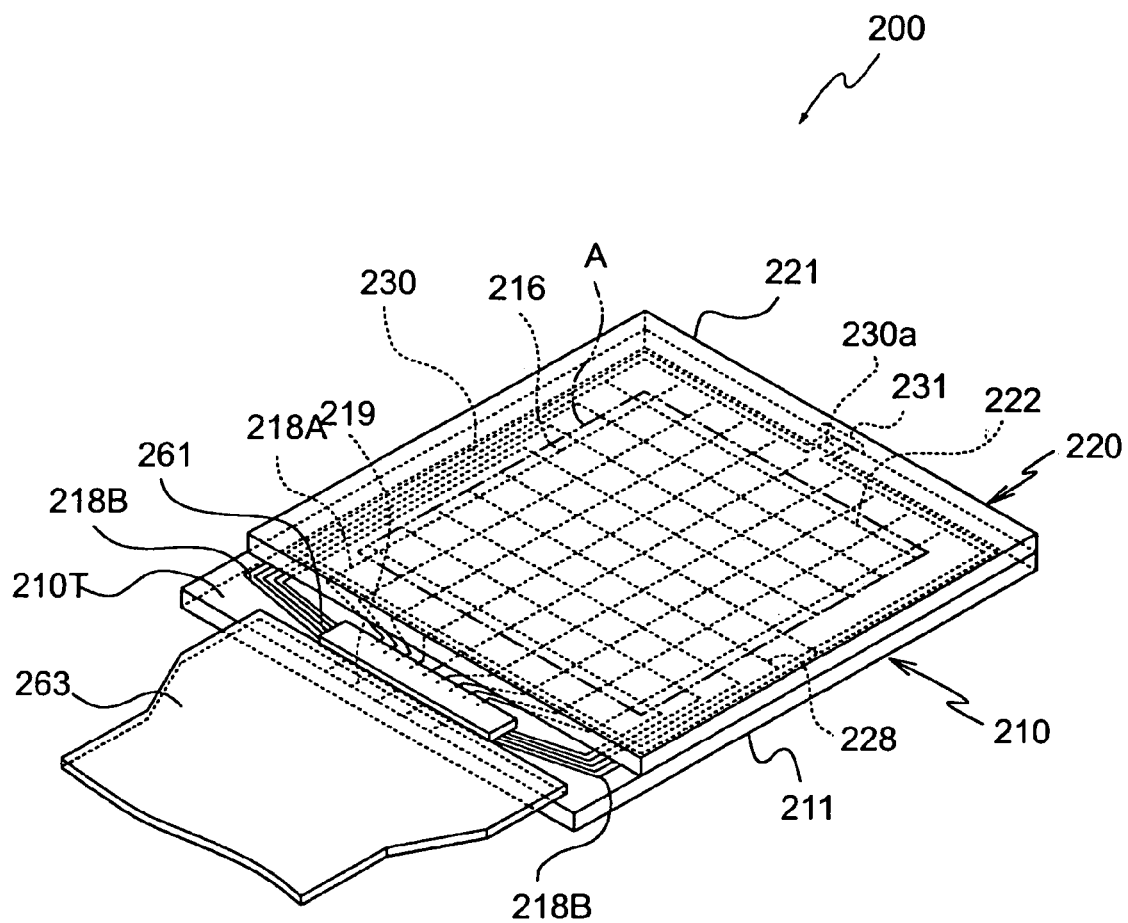
FIG. 23 is a schematic perspective view showing the appearance of a simple matrix liquid crystal panel.
Figure 24:
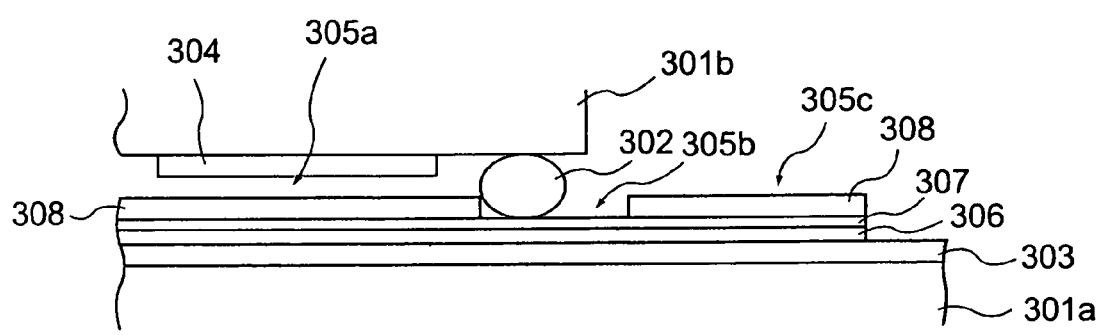
FIG. 24 is a view for illustrating a wiring structure of a related liquid crystal panel.

For example, the liquid crystal panel of the fifth embodiment employs an active matrix system using a TFD (thin film diode); however, as shown in FIG. 22, the liquid crystal panel may be applied to an active matrix electro-optical device using a TFT (thin film transistor) or may also be applied to a simple matrix electro-optical device as shown in FIG. 23.

In addition, although having a so-called COG structure, the liquid crystal panel of the fifth embodiment may be a liquid crystal panel having the structure in which IC chips are not directly mounted. That is, for example, the structure in which a flexible circuit board or a TAB substrate is connected to a liquid crystal panel may also be used.

What is claimed is:

1. A liquid crystal panel comprising:
a first substrate;
a second substrate opposed to the first substrate and including a mounting section that extends beyond the first substrate;
at least one of an IC chip and a flexible cable mounted at the mounting section of the second substrate;
a liquid crystal material between the first and second substrates;
a seal material that seals the liquid crystal within a sealed area between the first and second substrates;
a corrosion resistant metal wire formed from a corrosion resistant metal, said corrosion resistant metal wire formed on one of the first and second substrates and extending from an area disposed outside the sealed area into the sealed area;
an oxide layer of the corrosion resistant metal formed on a surface of the corrosion resistant metal wire, at least one through hole extending through the oxide layer and into the corrosion resistant metal wire so that the through hole forms a sidewall of the corrosion resistant metal wire;
a non-corrosion resistant metal wire including a first section disposed within the sealed area to the inside of the seal material and a second section, the first section extending from the seal material to the mounting section of the second substrate, the first and second sections extending into the through hole and physically contacting the sidewall of the corrosion resistant metal wire at a location inside the sealed area; and
a transparent conductive oxide film covering the second section of the non-corrosion resistant material metal wire and not covering the first section of the non-corrosion resistant material metal wire.

2. The liquid crystal panel according to claim 1, further comprising:
a conductive inorganic oxide film on a surface of the non-corrosion resistant metal wire.

3. The liquid crystal panel according to claim 1, wherein a line width of the non-corrosion resistant metal wire is enlarged at a bonding portion at which the corrosion resistant metal wire and the non-corrosion resistant metal wire are bonded to each other.

4. The liquid crystal panel according to claim 1, wherein the at last one through hole further comprises a plurality of through-holes arranged in a matrix.

5. The liquid crystal panel according to claim 1, wherein the at least one through-hole has an inclined sidewall.

6. The liquid crystal panel according to claim 1, wherein the corrosion resistant metal wire and the non-corrosion resistant metal wire are electrically connected to each other at a first bonding portion and a second bonding portion, the first bonding portion and the second bonding portion being electrically connected to each with the corrosion resistant metal wire, and a conductive inorganic oxide film is formed on a surface of the non-corrosion resistant metal wire at the second bonding portion.

7. The liquid crystal panel according to claim 1, wherein the corrosion resistant metal wire comprises tantalum, and the non-corrosion resistant metal wire comprises chromium.

8. The liquid crystal panel according to claim 1, wherein the corrosion resistant metal wire has an inclined end portion.

9. The liquid crystal panel according to claim 1, wherein the non-corrosion resistant metal wire has an inclined end portion.

10. A liquid crystal panel comprising:
a first substrate;
a second substrate opposed to the first substrate and including a mounting section that extends beyond the first substrate;
a liquid crystal material between the first and second substrates;
a seal material that seals the liquid crystal within a sealed area between the first and second substrates;
a corrosion resistant metal wire formed from a corrosion resistant metal, said corrosion resistant metal wire formed on the second substrate and extending from an area disposed outside the sealed area into the sealed area;
an oxide layer of the corrosion resistant metal formed on a surface of the corrosion resistant metal wire;
a plurality of through holes extending through the oxide layer and into the corrosion resistant metal wire at positions inside the sealed area and outside the sealed area, the through holes forming a plurality of sidewalls in the corrosion resistant metal wire;
a non-corrosion resistant metal wire formed on the second substrate including a first section disposed within the sealed area at a position inboard of the seal material and a second section disposed outside the sealed area at a position outboard of the seal material, the second section being formed on the mounting section, the first and second sections extending into the through holes and physically contacting the sidewall of the corrosion resistant metal wire at the positions inside the sealed area and the positions outside the sealed area; and
a transparent conductive oxide film covering the second section of the non-corrosion resistant material metal wire and not covering the first section of the non-corrosion resistant material metal wire.

11. The liquid crystal panel according to claim 10, wherein the transparent conductive oxide film is a conductive inorganic oxide film.

12. The liquid crystal panel according to claim 10, wherein a line width of the non-corrosion resistant metal wire is enlarged at a bonding portion at which the corrosion resistant metal wire and the non-corrosion resistant metal wire are bonded to each other.

13. The liquid crystal panel according to claim 10, wherein the through-holes are arranged in a matrix.

14. The liquid crystal panel according to claim 10, wherein the through-hole have an inclined sidewall.

15. The liquid crystal panel according to claim 10, wherein the corrosion resistant metal wire comprises tantalum, and the non-corrosion resistant metal wire comprises chromium.

* * * * *